(12) United States Patent
Fogg

(10) Patent No.: US 6,466,624 B1
(45) Date of Patent: Oct. 15, 2002

(54) VIDEO DECODER WITH BIT STREAM BASED ENHANCEMENTS

(75) Inventor: Chad Edward Fogg, Seattle, WA (US)

(73) Assignee: Pixonics, LLC, Palo Alto, CA (US)

( * ) Notice: Subject to any disclaimer, the term of this patent is extended or adjusted under 35 U.S.C. 154(b) by 0 days.

(21) Appl. No.: 09/417,989

(22) Filed: Oct. 13, 1999

Related U.S. Application Data

(60) Provisional application No. 60/105,926, filed on Oct. 28, 1998, and provisional application No. 60/123,300, filed on Mar. 3, 1999.

(51) Int. Cl.[7] .............................................. H04N 7/18
(52) U.S. Cl. ......................... 375/240.27; 375/240.29; 375/240.12
(58) Field of Search ........................ 375/240.1–240.29

(56) References Cited

U.S. PATENT DOCUMENTS

| | | | |
|---|---|---|---|
| 4,924,522 A | 5/1990 | Bray et al. ................... 382/56 |
| 5,325,449 A | 6/1994 | Burt et al. ................... 382/56 |
| 5,341,174 A | 8/1994 | Xue et al. ................... 348/576 |
| 5,515,111 A | 5/1996 | Guedalia .................... 348/427 |
| 5,535,291 A | 7/1996 | Spencer et al. ............. 382/254 |
| 5,633,956 A | 5/1997 | Burl ........................... 382/275 |
| 5,642,168 A | 6/1997 | Masaki ....................... 348/441 |
| 5,673,376 A | 9/1997 | Ray et al. .................... 395/127 |
| 5,691,775 A | * 11/1997 | Astle ...................... 375/240.15 |
| 5,696,848 A | 12/1997 | Patti et al. .................. 382/254 |
| 5,719,594 A | 2/1998 | Potu ........................... 345/130 |
| 5,748,507 A | 5/1998 | Abatzoglou et al. ........ 364/572 |
| 5,778,102 A | 7/1998 | Sandford, II et al. ....... 382/251 |

* cited by examiner

Primary Examiner—Andy Rao
(74) Attorney, Agent, or Firm—Wells St. John P.S.

(57) ABSTRACT

An advanced decoder provides enhancement processing in accordance with information previously known only to the decoder and/or encoder. Preferably, advanced digital video image enhancement utilizing bitstream information is provided in an integrated manner with advanced decoding and, more preferably, provides for MPEG decoding and image enhancement. In addition to advanced edge detection and other advanced processing tools, the invention further enables the use of decoder based coding-type operations, such as reverse superresolution, as well as advanced superresolution, and 3-D display processing techniques in conjunction with video processing. The invention is therefore capable of reducing system complexity and/or bandwidth, requirements, and improving system robustness and/or the ultimate quality of the enhanced video signal, among other advantages.

20 Claims, 19 Drawing Sheets

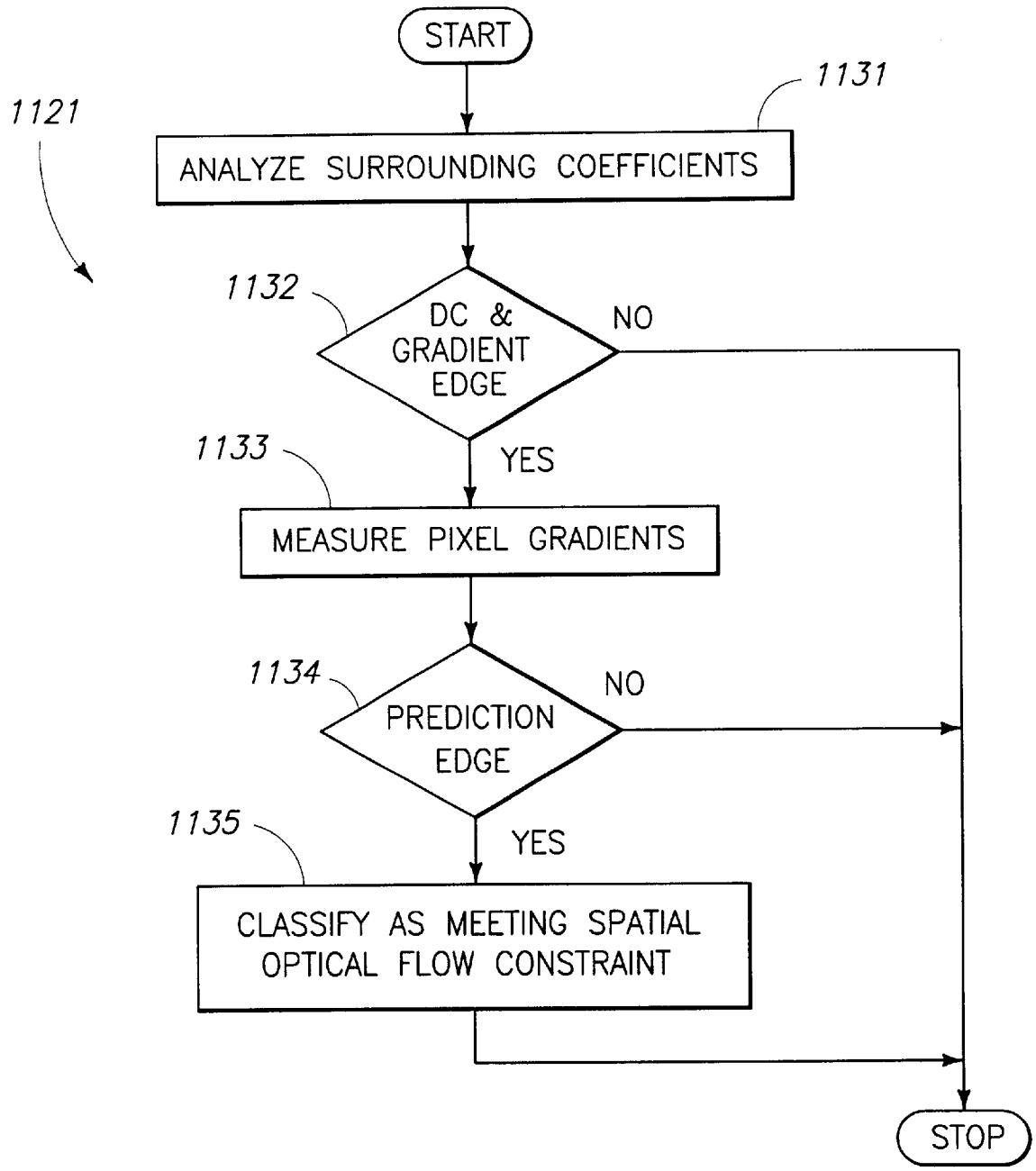

VIDEO DECODER WITH BIT STREAM BASED ENHANCEMENTS

CROSS-REFERENCE TO PRIOR APPLICATIONS

This application claims priority to and hereby incorporates by reference co-pending U.S. Provisional Patent Application Ser. No. 60/105,926, entitled "MPEG Decoder with Stream Based Enhancement", filed on Oct. 28, 1998 and U.S. Provisional Patent Application Ser. No. 60/123,300, entitled "Superresolution Encoder and Decoder", filed on Mar. 3, 1999. This application also claims priority to and hereby incorporates by reference U.S. patent application Ser. No. 09/250,424, now U.S. Pat. No. 6,157,396, entitled "Digital Display Systems", filed on Feb. 16, 1999 and U.S. patent application Ser. No. 09/277,100, now U.S. Pat. No. 6,340,994 B1, entitled "System & Method for Using Temporal Gamma and Reverse Superresolution to Process Images for Use in Digital Display Systems", filed on Mar. 26, 1999, and U.S. patent application Ser. No. 09/372,656, entitled "Video Coding and Reconstruction Apparatus and Methods", filed on August 11, 1999.

BACKGROUND OF THE INVENTION

1. Field of the Invention

The present invention relates generally to digital video and, more particularly, to digital video reconstruction.

2. Discussion of Prior Art

Video processing has evolved with the economic phases of video formats. In early analog video, filtering and delay line manipulation of continuous signals, $s_c(t)$, typically provided only one-dimensional ("1-D") processing of a small neighborhood of data along a single scan line. Compression-primarily signal limiting and added component interleaving-included band-limiting, interlace scanning, RGB-to-YUV color-space conversion, subcarrier insertion and vestigial side-band modulation. Enhancement processing stages, such as comb filtering, YUV-to-RGB color-space restoration, were also added for correction of compression effects.

Two-dimensional ("2D") digital video enabled more precise multiple scan-line processing of discrete signals, s(t). Among other advantages, single-image compression techniques, such as the Joint Photographic Experts Group standard ("JPEG"), could now be used to provide digital video image reproduction without perceivable artifacts or "transparent" digital coding. Newer enhancement processing stages, such as time base correction ("TBC"), 2-D comb filtering, edge enhancement and noise reduction, were also enabled.

Recently, 3-dimensional or "3-D" video processing (i.e. of horizontal, vertical and temporal image aspects) has emerged, most notably, Moving Pictures Experts Group or "MPEG" standards. MPEG-1, for example, introduced block-based motion compensated prediction ("MCPn"), which describes the interframe movement of blocks displaced from arbitrary locations. Using MCPn, rudimentary groups of pictures or "GOPs" are formed in which a higher-bitrate "intra-coded" or "I" frame/macroblock can be followed by lower-bitrate differentially-coded predictive and bi-directional or "P" & "B" frames/macroblocks (e.g. IBBPBB). Advantageously, differential-coding typically provides a three-fold compression improvement over still-frame digital image coding. Further, such 3-D coding techniques as synthetic coding (e.g. MPEG-4) are expected to provide even greater compression through more advanced motion models than those used according to current block-based coding.

Despite such advances, however, traditional processing approaches continue to be utilized. For example, while coding, decoding and enhancement processing are typically included within matched encoder-decoder pairs or "codecs," such processing continues to be conducted as separate and distinct processing stages. One likely reason is that the predominant video codec standards MPEG and its progeny define the generic standard-compliant decoder as one that uses proscribed rules and algorithms or "semantics" that react to coded bitstream elements to provide a one-to-mapping from the input bitstream into an expected output sequence of samples; using such standards, the resulting uncompressed video signals resemble analog signals closely enough that traditional post processing enhancement methods can be readily applied. Another possible reason, among others, is that the conversion of the intermediate decoder output stream into a display format is usually defined by a separate application specification, such as ATSC, DVD or DVB and their progeny.

As shown in FIG. 1, for example, a conventional MPEG encoder 101 typically comprises separate processing stages for pre-processing 111, coding 113 and (optionally) multiplexing 115 a received video source; complimentarily, an MPEG decoder 103 includes stages for de-multiplexing 131 received standard-coded data, decoding 133 the de-multiplexed data, and then post-processing 135 the resulting decoded data samples. Preprocessing stages typically provide for artifact reduction (e.g. noise filtering, time-base correction, etc.) and codec accommodation (e.g. anti-alias low-pass filtering; entropy minimization filtering, downsampling, etc.). Post-processing stages, which conventionally typically provide for codec accommodation (e.g. de-interlacing) and display format conversion, but can also enable image improvement.

Unfortunately, such traditional approaches are capable of only limited image improvement. To make matters worse, conventional approaches require substantial estimation, iteration and computation, which need is exacerbated by real-time operation required for continuous video display. De-interlacing, for example, aims to convert an interlaced signal for progressive display. However, while an interlace signal might contain some progressive content (e.g. 3:2 pulldown film) or interlace coding (e.g. MPEG interlace DCT and field prediction tools), the challenge of de-interlacing remains that of using decoded samples to estimate what the decoded image content would have been if it had been progressively scanned. To make matters even more difficult, the most effective estimation technique potentially useable by conventional codecs, for tracking decoded objects across several frame periods and then filtering along those points, is very computationally expensive.

Other feature enhancements are similarly limited by traditional processing approaches. For example, conventional frame rate conversion uses repeated frames to increase display rate, and frame interpolation to improve object motion smoothness; however, conventional frame interpolation suffers from object tracking requirements as with de-interlacing. Motion blur reduction can also be used to recover some detail lost to object motion during camera integration; however, detail needed by the "inverse blurring algorithm" is likely lost through compression and decoding, and only minor improvement can be achieved by fusing information across frame periods of decoded sample data.

Feature enhancement can further be used to emphasize detail that is otherwise below the human visible threshold. However, sub-threshold emphasis is often at odds with conventional encoder filtering-out of imperceptible image attributes, and conventional high-pass filtering of decoded data samples is capable of providing only limited feature enhancement and can actually increase the visibility of compression artifacts.

In emerging "superresolution" techniques, an attempt is made to provide for image restoration and enhancement using "enhancement-facilitating" information found to exist within decoded data samples. For example, bitstream vectors are used in an attempt to link areas in the original reference picture (i.e. prior to quantization) which most closely resemble the current picture. Typically, each vector is refined to half- pixel accuracy by comparing the original current macroblock against the decoded reference picture. Each final selected vector then forms a prediction address from the decoded reference picture. Further accuracy for the current macroblock is also attempted by adding the DCT-coded prediction error to the prediction formed in an earlier motion compensated prediction or "MCP" stage. One model of video restoration theory, for example, describes the observed signal, g, as the original signal, s, convoluted by the point spread function distortion ("PSF-distortion") D plus the noise, v, as given by the following equation 1:

$$g=Ds+v \qquad \text{[Equation 1]}:$$

Unfortunately, the existence of enhancement information in decoded image samples is only a fortuitous byproduct of pre-encoder processing, preprocessing, coding and decoding, and conventional superresolution has not yet been proven viable using real-world encoded (i.e. and then decoded) video. Thus, while some enhancement capability has been demonstrated in controlled contexts, conventional superresolution, as with other conventional techniques, is found to be computationally expensive and unreliable. Worse yet, the inconsistent intra-frame and temporal enhancement produced by such methods are often obvious and distracting to a viewer, such that the results produced might be even more detrimental than without such enhancement.

Accordingly, there is a need for apparatus and methods capable of more effectively performing video decoding and enhancement.

SUMMARY OF THE INVENTION

Broadly stated, the present invention provides for advanced processing of a standard-coded digital video signal using information other than standard-decoded data samples. Preferably, such processing is conducted by an advanced decoder comprising coding, decoding and enhancement tools capable of utilizing bitstream data to perform both decoding and image enhancement. Advanced processing further preferably includes such image enhancement capability as resolution enhancement, improved motion portrayal and artifact suppression, but can more generally include these and/or a wide variety of other enhancements as might be desirable in accordance with a particular application.

More specifically, the invention breaks with traditional processing segmentation and instead provides, whether actually implemented in a more integrated or separated configuration, for more integrated codec stage operation and data utilization. In one aspect, the invention provides for the use of both coding and decoding type tools in performing standard-compliant decoding and image enhancement operations. In another aspect, the invention enables the use of bitstream state elements for facilitating enhancement processing. In a further aspect, the invention enables enhancement not inconsistent with conventional superresolution that is also capable of utilizing compressed image representations. The invention further provides for advanced decoder implementations capable of providing the aforementioned as well as yet other decoding and image enhancement capabilities.

In accordance with the present invention, enhancement processing is preferably capable of utilizing techniques consistent with those teachings broadly referred to by the above-referenced co-pending patent applications as "superresolution" and "reverse superresolution" (or "SR" and "RSR" respectively). It will become apparent, however, that the RSR does not describe merely the reverse of SR, even as SR is extended beyond conventional meaning by such applications to incorporate their teachings.

However, in order to further the useful broad classifications established by such applications, SR is used herein in the context of enhancement processing to refer to all quality/functionality improving reconstruction (i.e. except standard decoding); in contrast, RSR will refer broadly to all advanced coding-type techniques. Additionally, the labels "conventional-SR" and "advanced-SR" will be used where operability-inhibiting limitations of conventional-SR might not be readily apparent. It should further be noted that the term "standard," as used herein, refers not only to formally standardized protocols, techniques, etc., but also to other methods and apparatus to which RSR, advanced-SR and/or other teachings of the present invention are capable of being applied.

Accordingly, in a preferred embodiment, the invention comprises an integrated advanced decoder capable of performing advanced standard-compliant decoding and enhancement processing. The advanced decoder preferably receives and parses standard-coded bitstreams, providing state and other bitstream elements and metrics for use in an integrated manner in performing enhancement processing. Such processing is further capable of utilizing techniques and/or apparatus (or "tools") that might be more traditionally considered "decoding-related" and/or "encoding-related," and more preferably, advanced-SR and RSR respectively (e.g. using diffused data and/or meta data as taught by the above-mentioned prior applications).

Advantageously, the present invention is capable of providing image enhancement in a robust and accurate manner. Since additional information utilized in accordance with the present invention provides insight as to the nature of the source image data and subsequent encoding, substantially less initial "guesswork" is required. In the case of bitstream data utilization, knowledge of how source information was encoded provides clues as to the source image itself, as well as how to better conduct enhancement processing. In the case of received diffused data, meta data and the like, actual multi-dimensional image elements and processing information can be used in conducting enhancement processing. In both cases, advanced decoding tools can also be utilized for advanced enhancement processing and for more advanced decoding. Also, in both cases, such advanced processing can be conducted with little or no impact on bitrate, such that data transfer and storage can remain essentially unaffected.

Further advantages also arise from the use of encoding-type processing during decoding. While handling each coding and decoding stage as a separate and distinct process has become well-entrenched in image processing, and particularly video, the present invention instead seeks to find the most effective overall processing path in order to achieve desired results. Stated alternatively, image processing is viewed as occurring within a super-domain in which any number of representational and processing capabilities might be more effectively conducted in accordance with the overall results to be achieved (e.g. using an appropriate knowledge base, tools and/or data). Among other benefits, many of which are noted in the above-referenced prior applications, the use of additional information for decoding and enhancement are greatly facilitated.

Yet other advantages include that the invention is susceptible to numerous variations in accordance with various applications and emerging standards. For example, the decoding and image enhancement capabilities of the invention can be configured in accordance with a variety of integrated, separately implemented and combined implementations (e.g. integrated decoding and enhancement; decoding and post-processing, etc.). Further, new standards can readily utilize decoding and/or enhancement techniques and tools as presented herein, and it is expected that newer standards might incorporate certain aspects of the invention, while still further advanced tools are developed and utilized in accordance with the teachings herein.

These and other objects and advantages of the present invention will become apparent to those skilled in the art after considering the following detailed specification together with the accompanying drawings.

BRIEF DESCRIPTION OF THE DRAWINGS

FIG. 2b is a flow diagram illustrating, in greater detail, the bitstream processor of the conventional decode-subsystem of FIG. 2a;

FIG. 2c is a flow diagram illustrating, in greater detail, the block data decoder or "BDD" of the conventional decode-subsystem of FIG. 2a;

FIG. 2d is a flow diagram illustrating, in greater detail, the operation of the motion-compensated predictor or "MCP" of the conventional decode-subsystem of FIG. 2a;

FIG. 11d is a flowchart illustrating, in greater detail, a DC and gradient based edge detection method useable in conjunction with the edge detection method of FIG. 11c according to the invention;

DETAILED DESCRIPTION OF THE PREFERRED EMBODIMENTS

In providing for advanced digital video decoding and enhancement, the present invention departs from limiting, layering, processing stage isolation and other traditional codec approaches. However, in retrospect, it is believed that various aspects of the invention can be more easily understood by way of contrast with a conventional codec operation, and more particularly, conventional decoding and post-processing. Therefore, while conventional standards typically espouse protocols rather than implementations, a reference conventional MPEG-2 compliant decode-subsystem (FIGS. 2a through 2f) and post-processor (FIGS.

3a through 3c) considered representative of available such devices are first discussed. Next, an integrated advanced decoder according to the invention and methods capable of being accomplished using the advanced decoder will be discussed, again using MPEG-2 as a consistent codec standard basis. It should be understood, however, that aspects of the invention are also applicable to various existing and future imaging standards other than MPEG-2, and can further be utilized in conjunction with and/or as replacements for a variety of conventional apparatus and/or methods operating in accordance with such standards.

Figure 1:
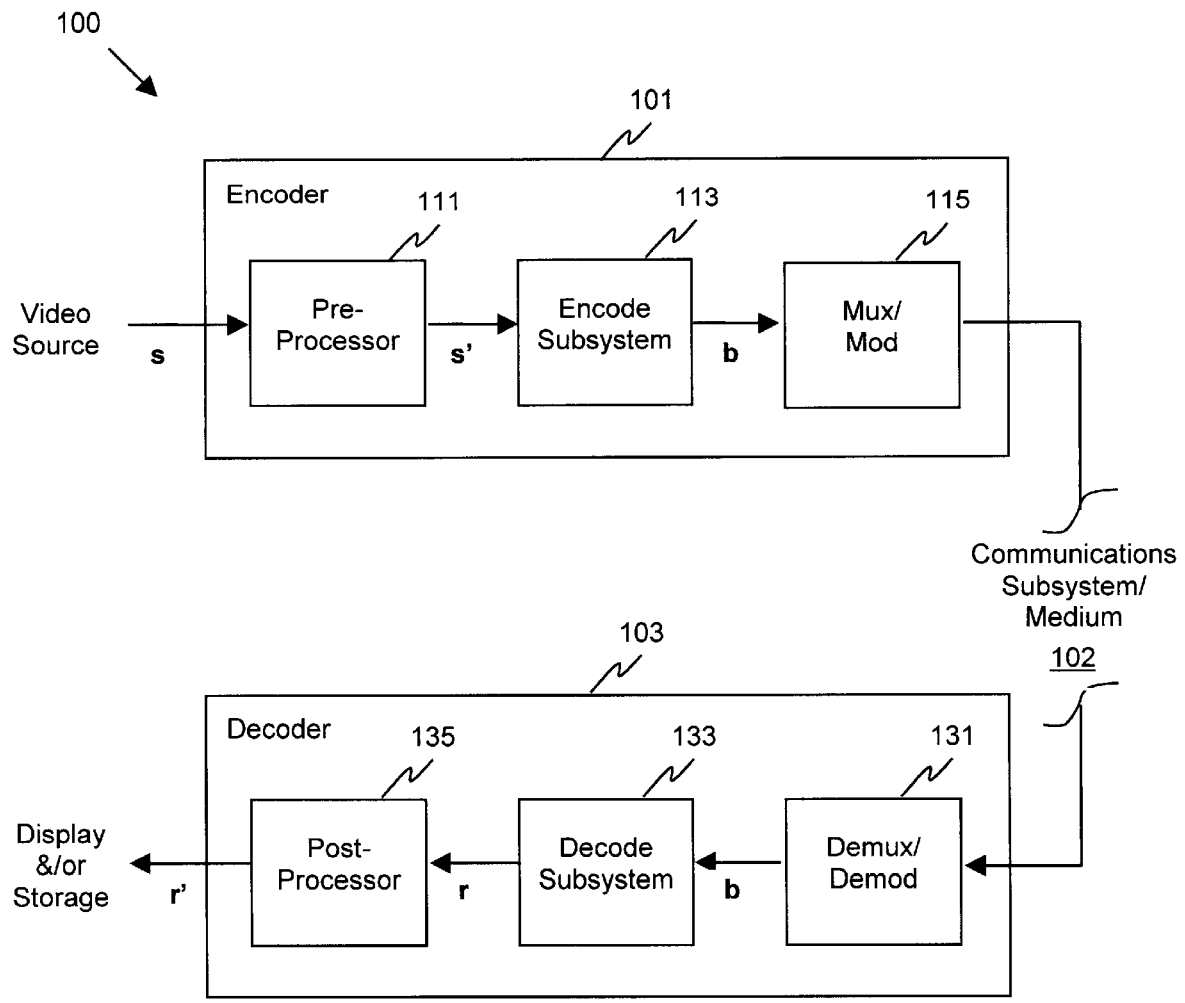
FIG. 1 is a flow diagram illustrating a conventional codec.
Figure 2A:
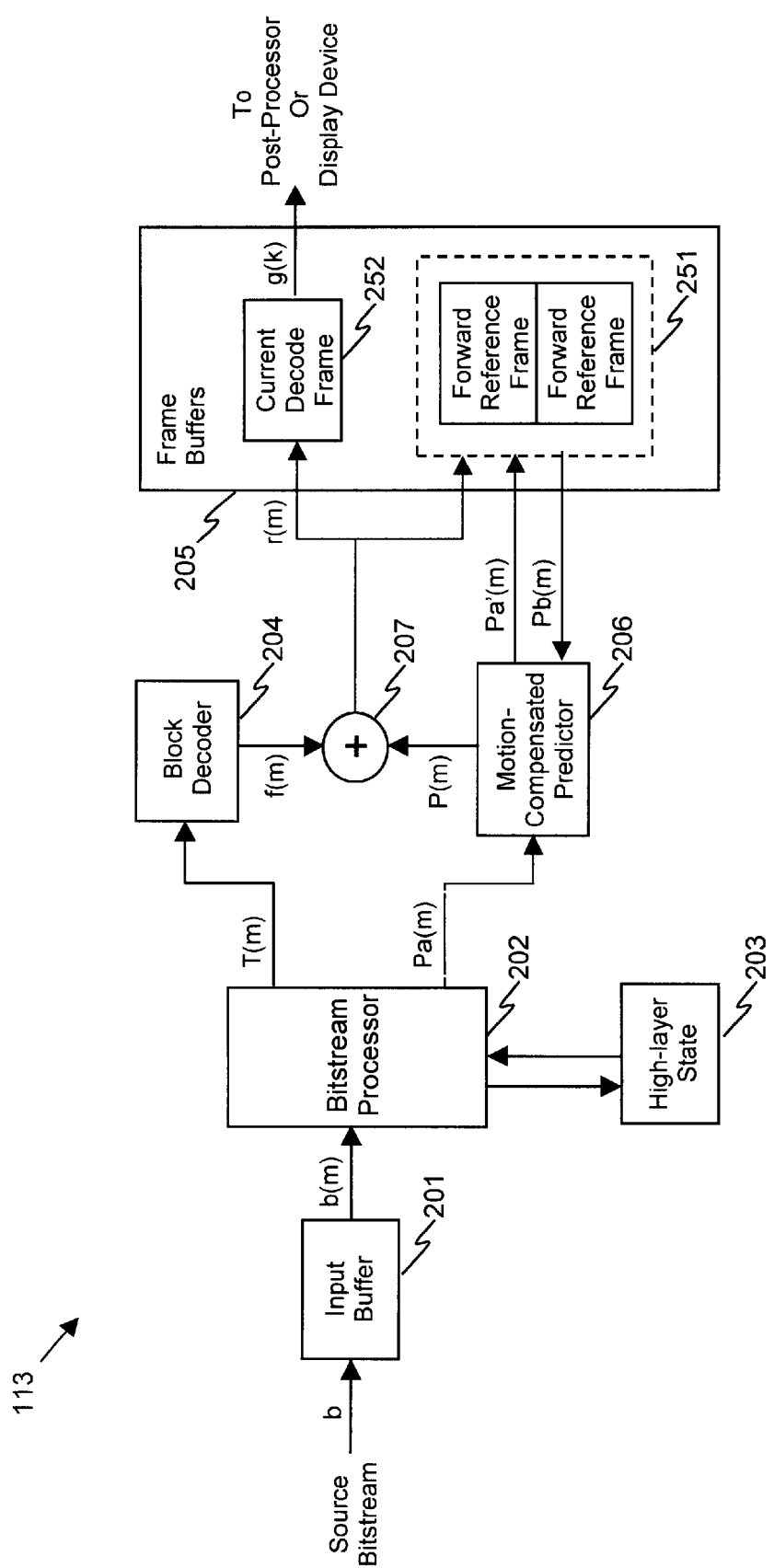
FIG. 2a is a flow diagram illustrating, in greater detail, a conventional decode-subsystem of the decoder of FIG. 1.

Beginning with FIG. 2a with reference to FIG. 1, conventional decode-subsystem 133 receives standard-coded data via a communications channel, demultiplexer and/or from storage (e.g. see FIG. 1). Input buffer 201, which receives the video data, operates as a FIFO and translates the variable-rate bitstream information to the instantaneous coded rate of each picture as it is consumed by the decoder.

Figure 2B:
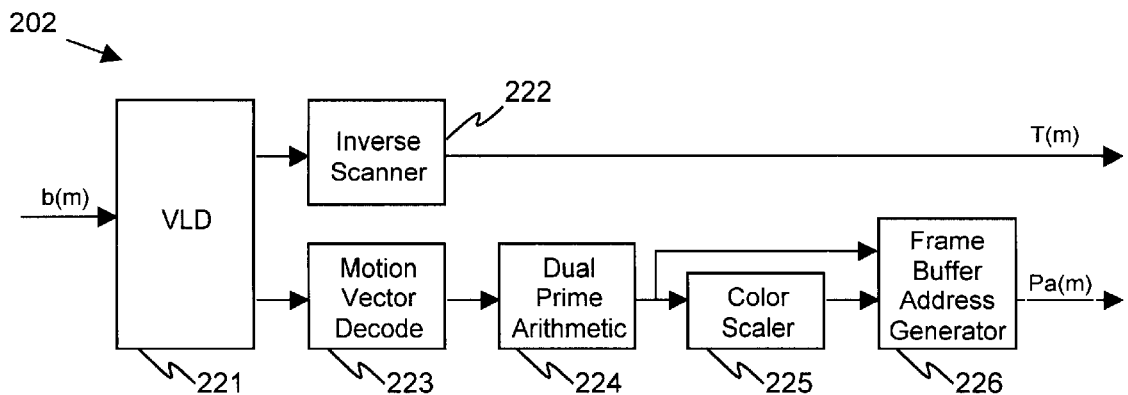

Bitstream processor 202 provides for converting the variable and fixed length tokens packed within the bitstream received from input buffer 201, into discrete elements useable by later decoder processing stages. As shown in FIG. 2a, bitstream processor 202 stores high-level state information used for making coding decisions in high-level state storage 203. Further outputs result in discrete bitstream elements, most notably DCT coefficients and motion vectors as parallel information streams. FIG. 2b illustrates in greater detail how, within bitstream processor 202, variable length decoder ("VLD") 221 and inverse scanner 222 provide DCT coefficient stream T(m), while motion vector stream Pa(m) is formed through the operations of VLD 221, motion vector decoder 223, dual prime arithmetic processor 224, color scaler 225 and frame buffer address generator 226.

Figure 2C:
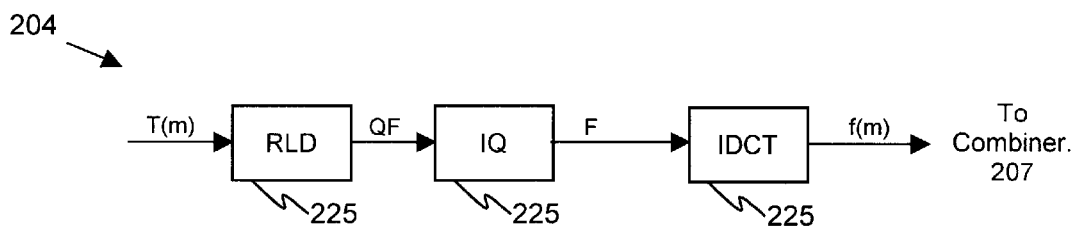
Figure 2D:
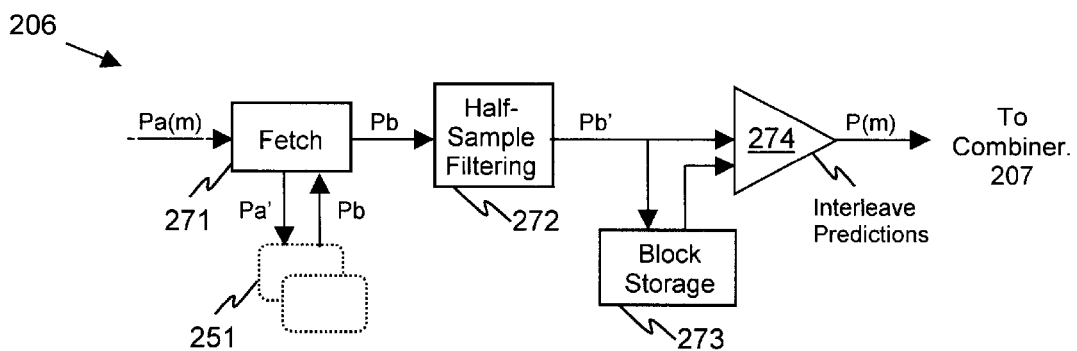

Continuing with FIG. 2c, block data decoder ("BDD") 204 receives the DCT coefficient stream T(m) from bitstream processor 202 and performs run-length decoding, inverse quantization, inverse discrete cosine transformation ("IDCT"), mismatch control and field-frame organization formatting. Block-decoded results, f(m), which comprise spatial-domain data including intra blocks or prediction error blocks (i.e. with a decoded non-intra block), are then output to combiner 207.

Motion-compensated predictor or "MCP" 206 (FIG. 2d) receives the motion vector stream Pa(m) from bitstream processor 202, which stream contains either motion vectors or prediction block addresses, as well as motion mode data. The motion mode data determines whether prediction blocks are extracted from frame buffer 205 and later organized into the final output prediction macroblock as either field or frame blocks.

Figure 2E:
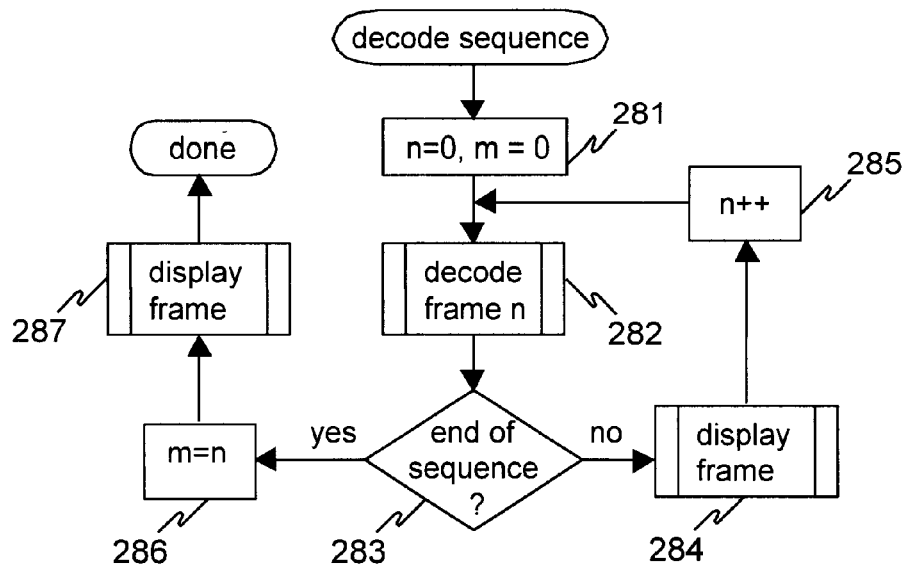
FIG. 2e is a flowchart summarizing the decode and display operation of the conventional decode subsystem of FIG. 1.
Figure 2F:
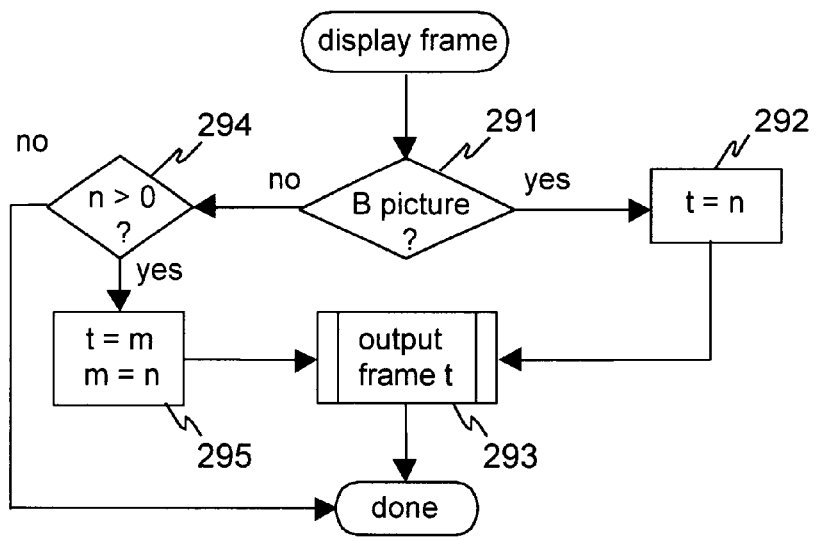
FIG. 2f is a flowchart illustrating how conventional decoding of B-pictures causes a decoding delay.

Returning to FIG. 2a, combiner 207 and frame buffer 205 function in accordance with MCP 206 and BBD 204 operation. Combiner 207 receives and combines MCP-decoded prediction data P(m) and BDD-decoded prediction error data f(m) to create a reconstructed macroblock r(m) which combiner stores in the reference frame portion 251 and current decode portion 252 of frame buffer 208. Only adjacent frames are utilized for prediction, and the contents of buffer 251 are deleted or simply replaced with successive such frames. (The standard MPEG reference decoder for Main Profile-Main Level, for example, requires only about 2 million bytes of frame buffer capacity.) FIG. 2e further illustrates how each current decoded frame successively stored in frame buffer 205 is typically displayed following decoding (i.e. including post-processing, which is discussed next). However, as illustrated in FIG. 2f a delay exists in decoding B-pictures due to the need to resolve forward and backward references.

Figure 3A:
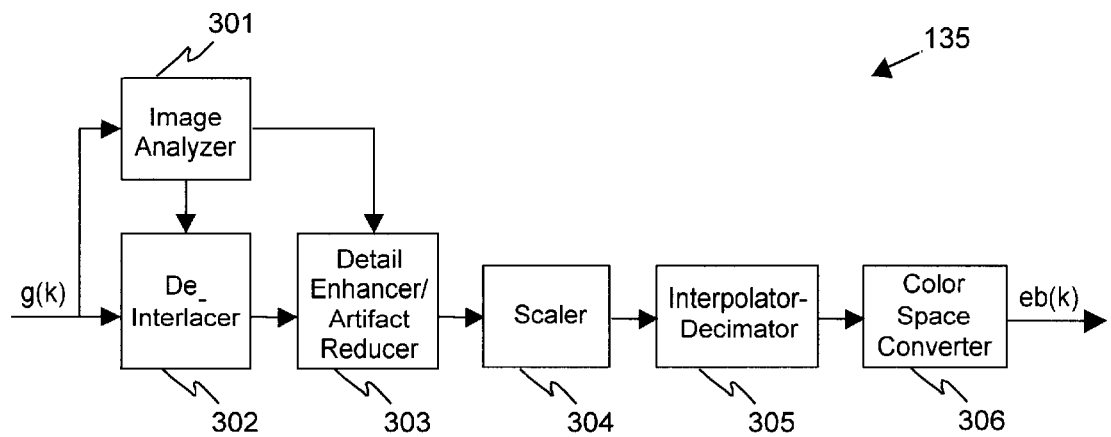
FIG. 3a is a flow diagram illustrating a conventional post-processor.
Figure 3B:
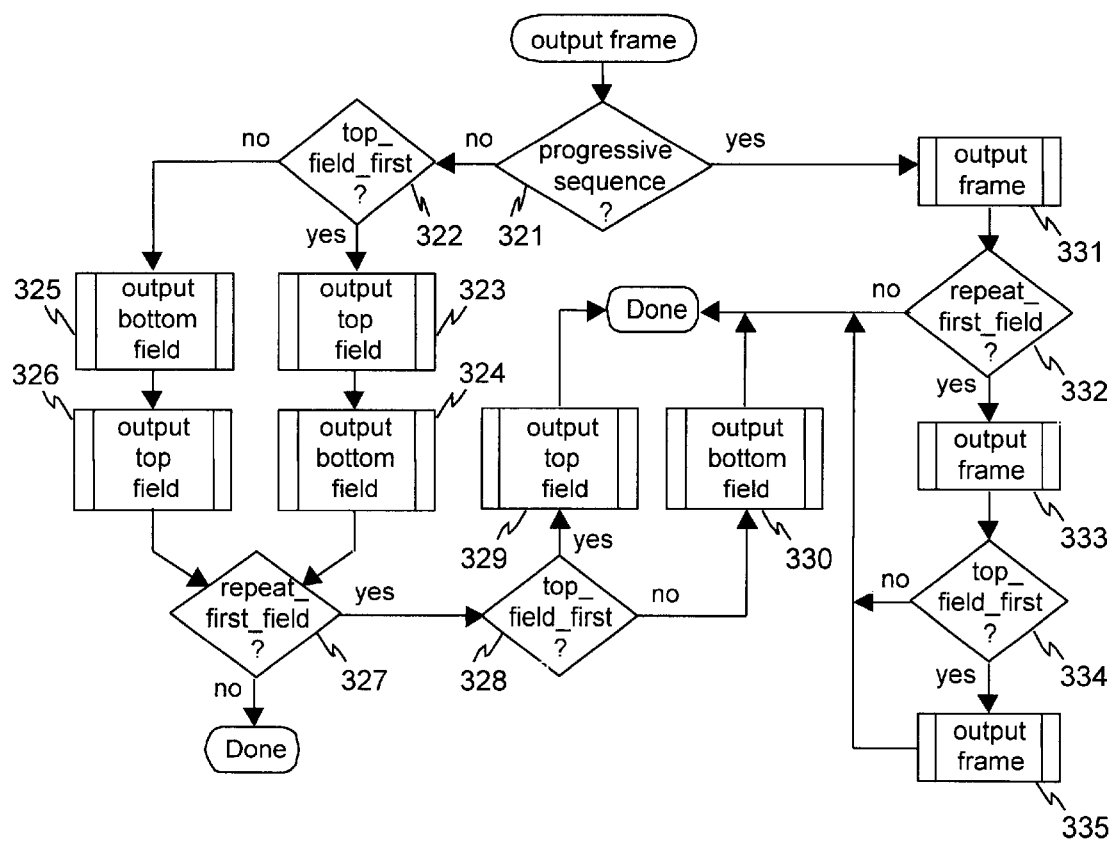
FIG. 3b is a flowchart illustrating how a rule associated with using picture header flags top_field_first and repeat_first_field is used in a conventional post-processor for de-interlacing.

FIGS. 3a and 3b further illustrate how a conventional post-processor is typically used to process decoded data samples formed in the manner given above. While the ordering of post-processing stages can vary, the depicted order is calculated to have low noise injection characteristics.

Post-processor 135 (FIG. 3a) includes image analyzer 301, de-interlacer 302, detail enhancer/artifact reducer 303, scaler 304 interpolator-decimator 305 and color space converter 306 stages. Image analyzer 201, which receives decoded data sample and header information g(k) received from decoder 113 (FIG. 2a), uses the input pictures, picture characteristics and header information (e.g. calorimetric data from the sequence_display_extension() header and picture layer indicators) to make display parameter decisions for the current picture. In addition to frame level processing, some conventional image analyzer implementations also provide finer granularity analysis at the block and even individual pixel level to provide locally adaptive fields for more accurate frame mode estimates and other metrics for further post-processor elements.

De-interlacer 302, which receives both decoder output g(k) and image analyzer frame mode estimates, performs conversion from the interlace display format of most television cameras, VCRs and video coding/application standards (e.g. MPEG-1, MPEG-2, DVD, HDTV), to a progressive display format used, for example, by personal computers or "PCs," newer flat-panel displays, etc. Actual high quality progressive display is, however, unavailable using a conventional codec. Among other reasons, high frequency content is most often removed during encoder-based preprocessing to avoid flicker in conjunction with interlace display. Also, in MPEG, it is not possible to completely separate decode and display aspects due to buffering restrictions such as VBV (see Annex C in ISO/IEC 13818.2, ITU-T H.262) which assume interlaced display intervals when removing bits from the buffer. However, the differing field time-bases of interlaced fields nevertheless necessitates at least format conversion.

Continuing with FIG. 3b, de-interlacing is typically performed in accordance with rules responsive to picture header flags top_field_first and repeat_first_field, which are further transferred to post-processor 135 along with the decoded data samples. As shown, if, in step 321 the current picture sequence is not a progressive sequence, then processing must assure consistent field ordering. Thus, if, in step 302, the top_field_first flag is true, then the top field is output in step 323, followed by the bottom field in step 324; otherwise, the bottom field is output in step 325 followed by the top field in step 326. Further, if, in step 327, the repeat_first_field flag is true, then the first field that was output earlier is again output (steps 328 and either 329 or 330). If instead, in step 321, the current sequence is a progressive sequence, then complete information is available on a per-frame basis. Thus, in this case, the current frame is output in step 332, followed (if top_field_first is true in step 334), by the repeated output of the current frame in step 335.

Returning again to FIG. 3a, further post-processing stages are conventionally conducted using the de-interlaced (i.e. progressive display) data from de-interlacer 302. For example, enhancer 303, can comprise a pixel-based convolution sharpening kernel or block edge filter to emphasize detail or to reduce the appearance of coding artifacts respectively. Scaler 304 is also used to fit progressive-display data to a desirable display resolution, which will often differ from the coded resolution of the video sequence. The coded frame rate can also be converted to a different display frame rate using interpolator-decimator 305. Finally, format-color space converter 306 can further be used to convert the display format as given above and to map the MPEG-specific color space. YcbCr, to the display device color space, which is usually RGB. Converter 309 (or an additional stage) can also be used to multiplex multiple component channels into a transport format suited for display, storage, or transmission.

Figure 4:
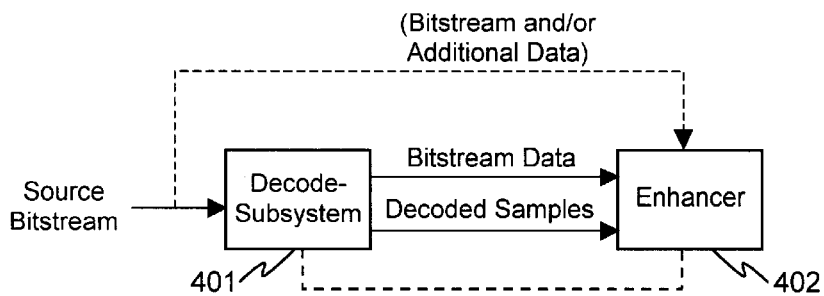
FIG. 4 is a flow diagram broadly illustrating an advanced decoder according to the invention.

The FIG. 4 flow diagram broadly illustrates a preferred advanced decoder according to the invention. As shown, decoder 400 comprises coupled elements including decode-subsystem 401 and enhancer 402. Compressed image data is received by decode unit 402 and reconstructed in a largely conventional manner. However, unlike the above discussed reconstruction, decode unit 402 also preferably operates to extract and preserve bitstream elements in raw and/or processed form. Enhancer 402 receives and performs enhancement processing in accordance with the decoded samples, as well as with the bitstream elements, which can provide clues as to the nature of the original images, pre-encoder processing and encoding. Alternatively, enhancer 402 can also be configured to receive bitstream elements directly and/or via a de-multiplexer (not shown), and can be further configured in a more integrated or more separated manner (e.g. in a post-processor type configuration). Enhancer 402 and/or decode-subsystem 401 are further preferably capable of directly and/or indirectly receiving further additional data, such as diffused and/or meta data, to further facilitate and/or improve image processing (e.g. as taught by the above-referenced co-pending application, Ser. No. 09/372,656).

More specifically, the invention extends the conventional superresolution model given in equation 1 (which is repeated here for convenience as Equation 2):

$$g=Ds+v \quad \text{[Equation 2]:}$$

to represent compressed digital video signals. Preferably, g becomes the decoded video, s becomes the original pre-compressed signal and v now represents quantization noise. Finally, the variable D remains the point spread function or "PSF," but with appropriate adjustments for compressed video. While the compression process alters the video spectrum and thwarts conventional-SR processing using only decoded video samples, the invention provides for using the original stream vectors to resolve ambiguity when creating temporal FIR trajectories. The invention further provides for using the original stream vectors to establish a starting point for motion search refinement.

The solution to the restoration problem of equation 2 is preferably iterative; it starts with a good initial estimate of the ideal original signal and then achieve a stable state or convergence after a number of iterations. Preferably, the decoded picture is used as an initial estimate; the residual or difference between what the encoder originally chose as the best vector (e.g. preserved bitstream vectors) and what the decoder would choose as the best predictor is further preferably bound to judge when enhancement achieves stability. Other residuals can also be utilized. For example, smooth images without coding artifacts, which can be constructed by "stacking up" motion compensated areas that meet optical flow constraints, can serve as the estimate of the ideal image.

Figure 5:
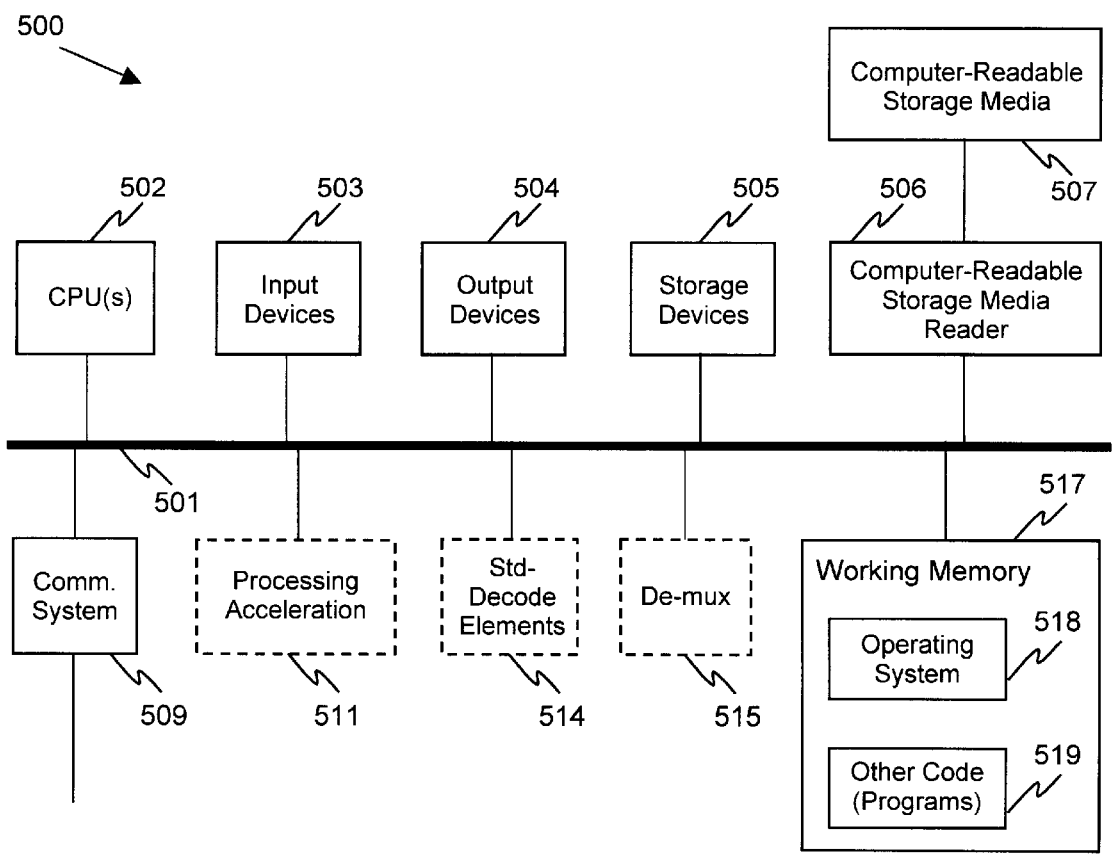
FIG. 5 is a block diagram broadly illustrating how an advanced decoder can be implemented within a host processing system according to the invention.

Turning to FIG. 5, while advanced decoder elements are implementable in various standalone configurations, they are also adaptable to integration within existing host processing systems, such as personal computers ("PCs") and settop boxes ("STBs"), among others. PCs, for example, provide a conventionally available platform with expandable computational power control capability, storage capability and other features desirable in conjunction with advanced decoding and enhancement processing. Similarly, emerging appliance-integrated and standalone "receiving" systems such as advanced STBs, while currently less capable than a PC, are expected to provide more complete processing capability, expandability and/or connectability to more comprehensively outfitted devices such as PCs. Such device types are also capable of supporting digital video and potentially other imaging application-specific components useful to the invention (e.g. standard decoder functions). For clarity sake, a PC will be presumed as a host processing system for advanced decoding and other aspects of the invention unless otherwise indicated.

As is broadly illustrated in FIG. 5, advanced-decoder 500 preferably comprises conventional PC hardware elements electrically connected via bus 501 including at least one central processor 502, input devices 503, output devices 504, storage devices 505, computer readable storage media reader 506, memory 507 and communications system 509. Computer-readable storage media reader 506 (e.g. memory and/or storage device interface) is further connected to computer-readable media 507 (e.g. memory and/or storage media which can also include memory 507 and/or storage devices 505). Additional, hardware elements can, for example, include processing acceleration 511 (e.g. digital signal processor(s), special-purpose processor(s), dedicated hardware, an expansion board; etc.) for accelerating more computationally intensive advanced-decoder operations. Input devices 503 can comprise any number of devices and/or device types for inputting commands and/or data, including but not limited to a keyboard, mouse, and/or speech recognition. Output devices preferably include a high definition display and audio system (e.g. HDTV) as well as standard-definition display capability (e.g. SDTV), such that decoded output for the two can be viewed and compared, and advanced-decoder operation can be further optimized (e.g. in an automatic and/or user-controllable manner).

Advanced decoder 500 further comprises software elements including operating system ("OS") 518 and other programs 520. Advanced decoder aspects are also capable of being controlled, modified, emulated and/or simulated using conventional programming and/or hardware tool techniques, as will become apparent to those skilled in the art. Other computer code or programs 520 refers to elements of advanced decoder 500, which can include such conventionally utilized computer-readable code as application programs, downloadable applets, databases and/or various other local and/or remote origination/destination computer-readable data and/or information.

It will be apparent to those skilled in the art that several variations of advanced codec elements given in FIG. 5 are contemplated and within the intended scope of the present invention. For example, given processor and computer performance variations and ongoing technological advancements, hardware elements may be embodied in software or in a combination of hardware and software. Similarly, software elements may be embodied in hardware or in a combination of hardware and software. Further, while connection to other computing devices is only generically indicated as communications system 509, wired, wireless, modem and/or other connection or connections to other computing devices, including but not limited to local area networks, wide area networks and the internet, might be utilized, among other possibilities. A further example is that the use of conventional multiple site viewing, information forwarding, collaboration, remote information retrieval, merging, and related capabilities are each contemplated. For example, advanced decoder tools can be downloaded via the internet and/or other network connection to communications system 509.

Various operating systems and data processing systems can also be utilized, however at least a conventional multitasking operating system such as Windows98® or Windows NT® (trademarks of Microsoft, Inc.) running on an IBM® (trademark to International Business Machines) compatible computer appears sufficient and will be presumed for the discussion herein. However, a fully multi-threaded real-time operating system is preferred, particularly where a combination of hardware and software are utilized (e.g. acceleration; expansion board video component implementations; etc.). Additional low-level coding might also be required, for example, with specialized acceleration and/or video component interfacing. The use of low level coding techniques applicable to the present invention are well-known by those skilled in the computer arts.

FIGS. 6 through 13 illustrate an example of an integrated advanced decoder implementation according to the invention. Beginning with FIG. 6, decoder 600 comprises coupled decoding and enhancement processing elements including bitstream parser-processor 602, modified block decoder 604, motion analyzer 606, spatial analyzer 607 video statistics generator or "control unit" 608 and renderer 609. Decoder 600 also comprises coupled storage elements including bitstream buffers 601, high-layer state storage 603 and frame buffers 605.

While the depicted advanced decoder example is configured in a similar manner as with the conventional decoder of FIG. 2 such that the invention might be better understood, those skilled in the art will appreciate that various decoding and/or enhancement processing configurations might be used in accordance with a particular application. For example, the depicted integrated implementation is desirable in avoiding redundant elements or element reuse that might run contrary to parallel processing and/or other acceleration opportunities (e.g. bitstream parsing/processing). The depicted configuration and flow are also calculated to provide robust processing with a low degree of resultant noise. However, other configurations, and/or process flow characteristics, might also be utilized. Further, various aspects of the invention might also be implemented as one or more post-processing stages capable of receiving and utilizing raw and/or prior processed bitstream elements, thereby providing for easier integration with existing systems, among other alternatives. A tradeoff will also likely exist with regard to the degree of programmability versus system performance. For example, greater programmability, while often less robust, will generally better facilitate the use of downloadable tools and/or tool modifications, determinable processing and process-flow determination, and accommodation of varying standards, bandwidth and/or other features (e.g. as taught by the above-mentioned co-pending applications).

While advanced decoder 600 differs substantially from the conventional decoder plus post-processor configuration of FIGS. 2a and 3a, a better understanding might be achieved by way of direct comparison with conventional approaches. According to such a comparison, advanced decoder 600 might be viewed as expounding upon conventional approaches by modifying conventional decoder elements (e.g. block decoding), adding elements for performing advanced reconstruction and encoding type operations (e.g. advanced-SR and RSR bitstream utilization respectively), and using non-standard constructs (e.g. inter-GOP processing) to enable more effective enhanced reconstruction.

More specifically, however, bitstream buffers 601 preferably comprises multiple, and more preferably, three bitstream buffering "portions" (i.e. using an appropriate storage structure or structures, as are well known in the computer arts). While input buffer 611 operates in a generally conventional manner, current buffer 611 and previous buffer 612 further store current-GOP and previous-GOP bitstream data respectively, thereby facilitating decoder 400 tracking of video frame information from one coding-dependent set of pictures to another, and further facilitating inter-GOP processing.

Figure 6:
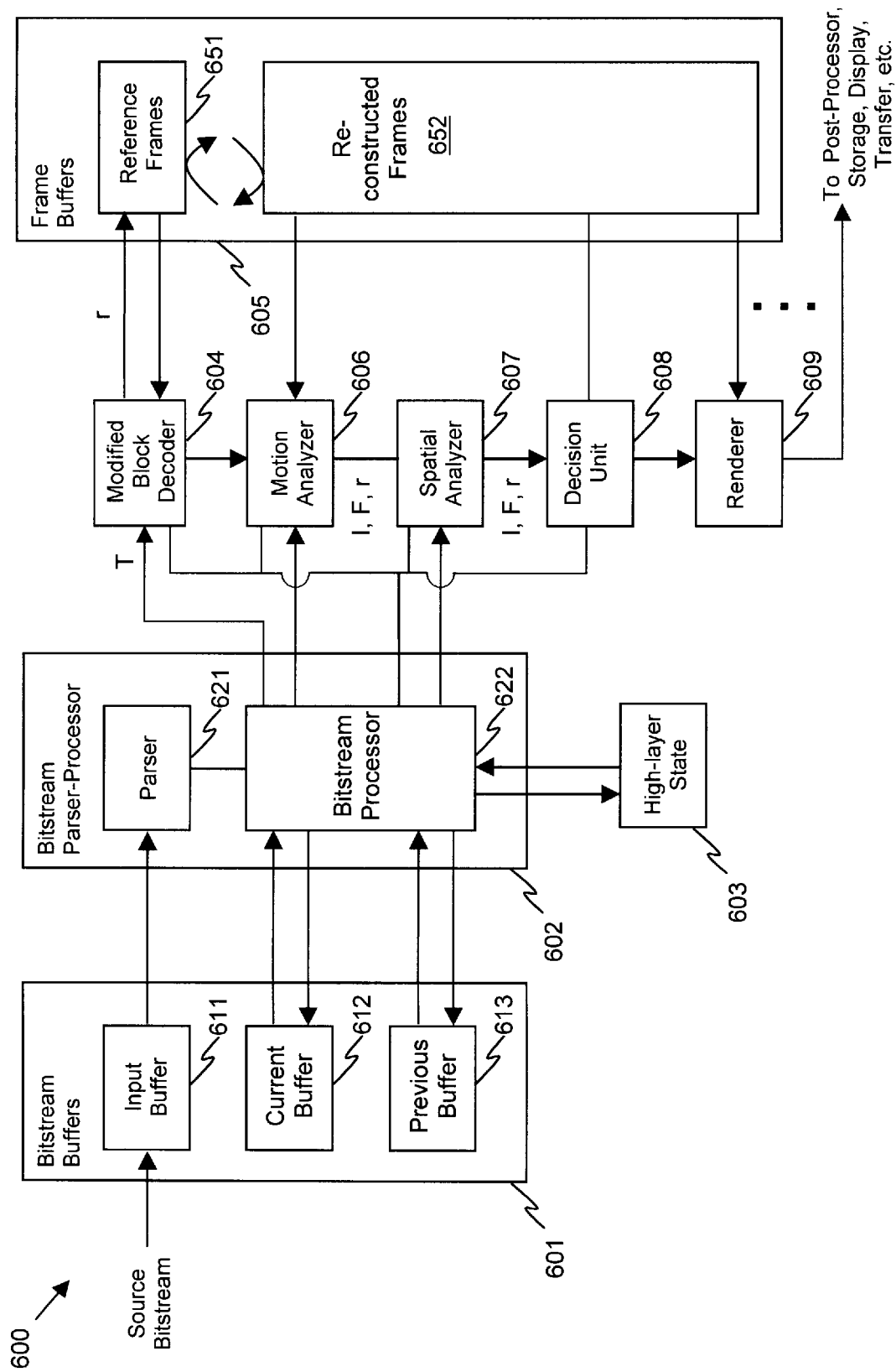
FIG. 6 is a flow diagram illustrating an integrated advanced decoder according to the invention.
Figure 7:
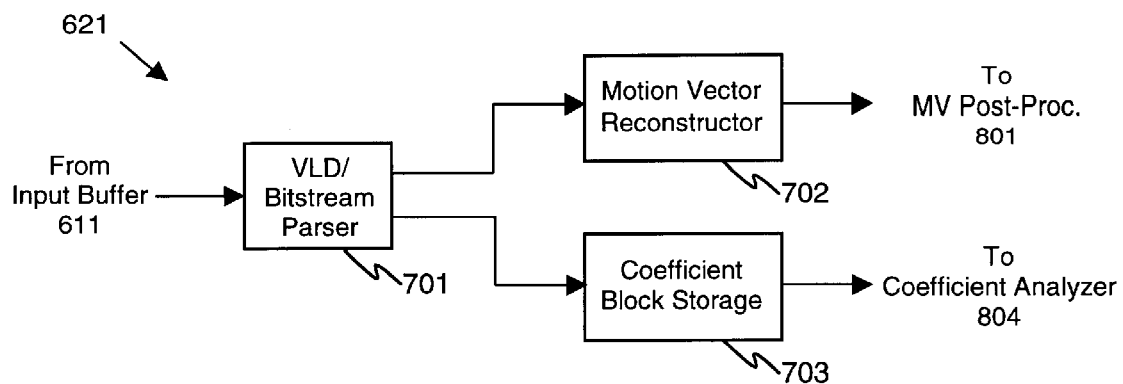
FIG. 7 is a flow diagram illustrating, in greater detail, the bitstream parser of the advanced decoder of FIG. 6.
Figure 8A:
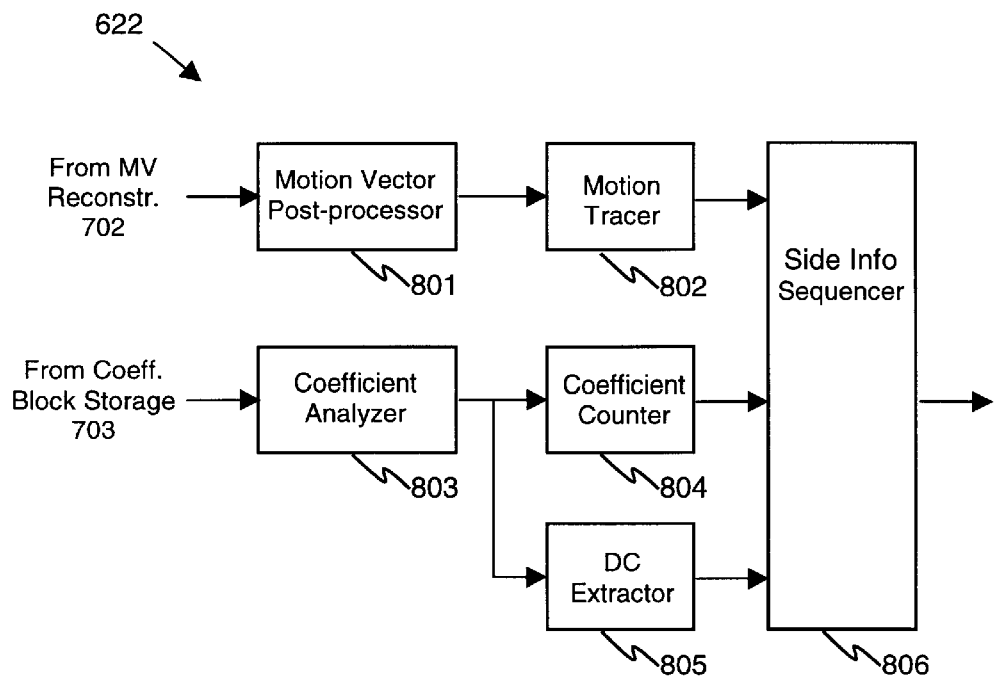
FIG. 8a is a flow diagram illustrating, in greater detail, the bitstream processor of the advanced decoder of FIG. 6.
Figure 8B:
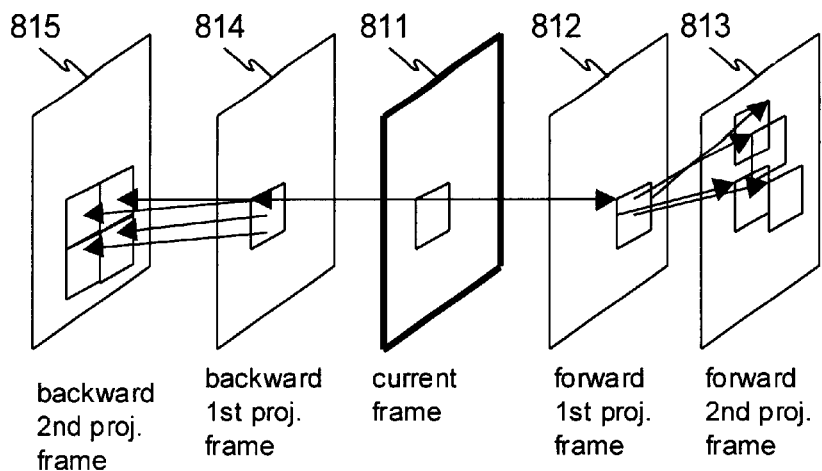
FIG. 8b illustrates a dependency found to exist within a compressed bitstream.
Figure 8C:
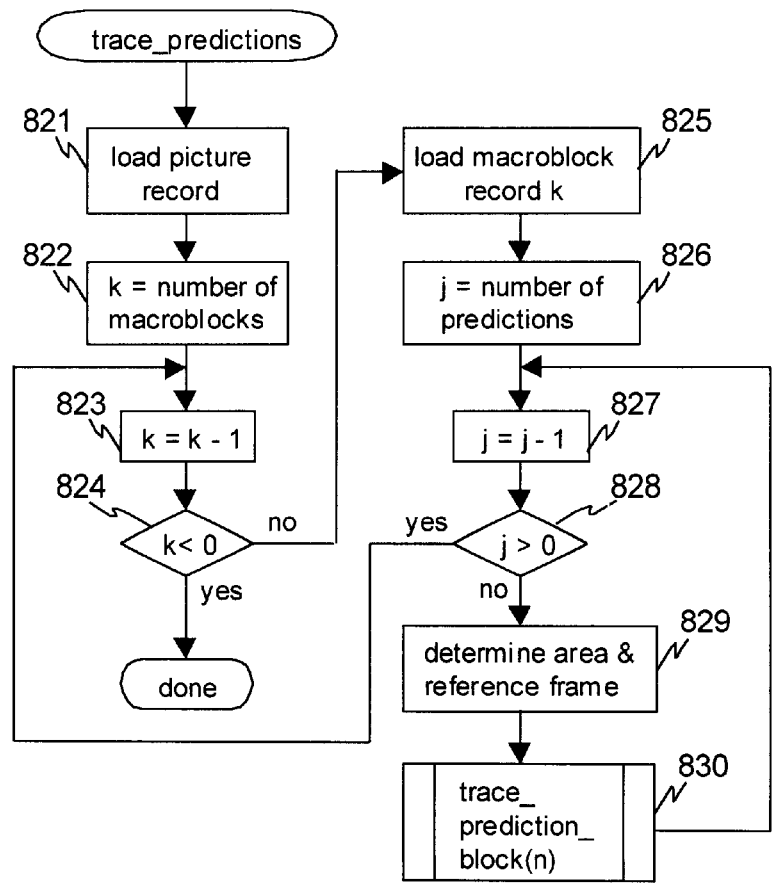
FIG. 8c is a flowchart illustrating a prediction tracing method adapted for use with MPEG-coded data according to the invention.
Figure 8D:
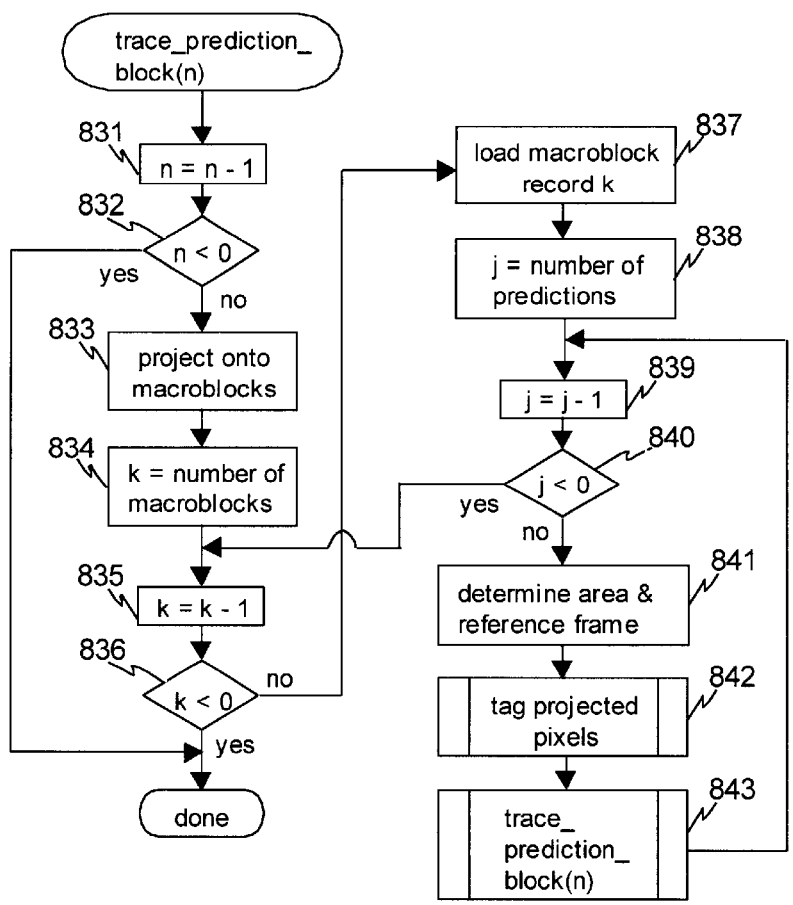
FIG. 8d is a flowchart illustrating a prediction block tracing method adapted for use with MPEG-coded data according to the invention.
Figure 8E:
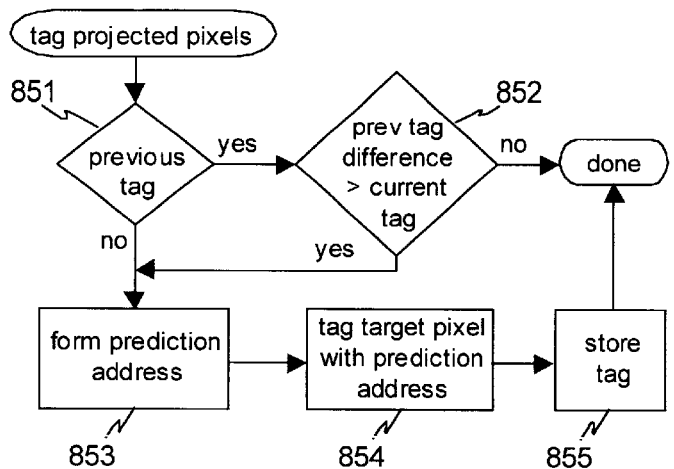
FIG. 8e is a flowchart illustrating a projected pixel tagging method adapted for use with MPEG-coded data according to the invention.
Figure 8F:
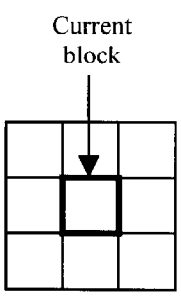
FIG. 8f illustrates how image element characteristics can be refined in accordance with surrounding block characteristics, as adapted for use with MPEG-coded data, according to the invention.
Figure 9:
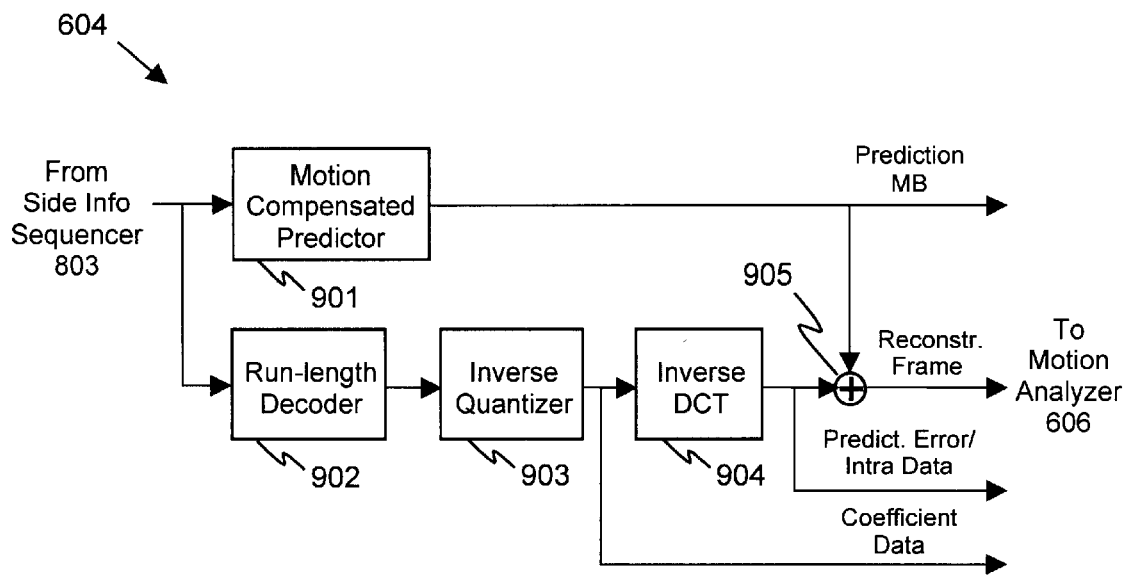
FIG. 9 is a flow diagram illustrating, in greater detail, the modified block decoder of the advanced decoder of FIG. 6.

Continuing with FIG. 6 with further reference to FIGS. 7 through 9, bitstream parser-processor ("BPP") 602 performs conventional bitstream parsing operations in a generally similar manner as with the conventional bitstream processor 202 of FIG. 2a. That is, bitstream parser 621 extracts fixed-length and variable-length elements from each bitstream portion received from input buffer 611 for delivery to other stages of advanced decoder 600. However, state information is made available only within the bitstream processor of conventional decoders, whereas, in the present invention, raw and/or processed state information is also made available to further system elements to enable more accurate and robust processing.

For example, the coded bit size of each block is extracted by parser 621 and then transferred via bitstream processor 622 to spatial analyzer 607 for use in forming estimates of image element/aspect activity. Macroblock quantizer scale code is also preserved (e.g. for facilitating noise estimation), and motion vectors are further preserved (e.g. for motion estimation; to facilitate point spread function or "PSF" filter design; etc.). Macroblock quantizer scale code, motion vectors, macroblock_type, motion_type, and dct_type are also preserved, among other examples of added bitstream information preservation and utilization according to the invention. Thus, among other aspects, the present invention comprises determining state information corresponding to a received bitstream and then utilizing such state information for image restoration and/or enhancement.

Such state information preservation and utilization can, for example, be broadly accomplished by modifying parser and processor operation to store and/or transfer such information, and then applying conventional encoder-based state information utilization techniques (e.g. see U.S. Pat. No. 5,144,424 to Saviatier et al, which discusses the use of the coded bit size of each block as an activity estimate in conjunction with a two-pass encoder). For example, FIG. 7 illustrates an exemplary parser 621 comprising variable length decoder ("VLD")/bitstream parser 701, motion vector reconstructor 702 and coefficient block storage 703, for performing bitstream element extraction, motion vector reconstruction and storage of block coefficients respectively.

Turning to FIG. 8a with reference to FIG. 6, bitstream processor 622 preferably operates in the coded domain, analyzing and/or otherwise processing directly-supplied ("raw") and/or intermediately processed data bitstream elements to provide metrics for further processing. Unlike conventional attempts to utilize only decoded samples for enhancement processing, metrics from this and other stages provide better clues than decoded samples alone as to the nature of the captured video source and encoder-based processing, the use of which enables further processing to provide more accurate and less computation-intensive enhancement results.

As shown in FIG. 8a, bitstream processor 622 preferably comprises coupled elements including motion vector post-processor ("MVPP") 801, motion tracer 802, coefficient analyzer 803, coefficient counter 804, DC-coefficient extractor 805 and side information sequencer 806. MVPP 801 receives motion vectors from motion vector reconstructor 702 of parser 621 and stores such motion vectors in current buffer 612 of bitstream buffers 601. Thereafter, bitstream elements corresponding to a received picture element within a current sequence are stored in current buffer 612 and previous bitstream elements are transferred to previous buffer 613.

Following MVPP processing, motion tracer 802 receives the processed motion vectors from MVPP 801 and uses them to track the optical pathway over several frames and to classify edges within each DCT block. As illustrated in FIG. 8b for example, the projection of any coded macroblock (e.g. again, using MPEG-2) can extend to arbitrary shapes over several frame periods until the dependency chain is reset by the next intra-coded picture (i.e. frame/macroblock). Any enhancement made to a current macroblock (e.g. frame 811) should thus, in theory, affect all projected areas in future and backward-projected frames (e.g. frames 812-13 and 814-15 respectively). The perceivable effects of modifications can also extend to frames outside the intra-frame bounded current sequence, as is taught, for example, by the above-referenced co-pending applications. Therefore, a knowledge of the optical pathway can be used to correct existing artifacts (e.g. as a result of encoding), to determine the most effective applications of enhancement processing and/or to avoid the creation of perceivable artifacts as a result of enhancement processing.

It is appreciated that, while motion tracing is not conventionally utilized in the manner just described or even for the discussed enhancement processing purposes, it is possible to apply motion detection techniques conventionally utilized during encoding. It is further expected that given sufficient processing resources, a motion estimator and other coding tools might be applied to such considerations, possibly achieving the most effective results. However, consistent with the expected significant processing requirements of the remaining processing steps and the inevitable need to conserve processing resources generally, a discovered less processing intensive motion vector tracing method is provided. Broadly stated, motion vector tracing according to the invention comprises receiving motion vectors and determining the affect of each motion vector to its dependent sample areas in previous and future pictures.

A macroblock-based motion vector tracing method is illustrated, for example, in FIGS. 8c through 8e, which method is applicable to a variety of picture sequences (e.g. intra-frame bounded; intra-GOP, inter-GOP, perceptual scenes, etc.). Such tracing is further preferably conducted at picture, block and pixel levels. Thus, beginning with FIG. 8c, a "prediction tracing" method is first conducted, during which optical pathways are estimated. As shown, a current picture record is loaded in step 821 and, in steps 822 and 823, a macroblock counter k is set according to the total number of macroblocks within the sequence being considered. If, in step 824, all macroblocks have been considered, then prediction tracing is completed; otherwise, prediction tracing continues in step 825. In step 825, the $k^{th}$ macroblock is loaded and, in steps 826 and 827, prediction counter j is set according to the number of predictions. If, in step 828, all predictions have been considered, then prediction tracing continues at step 823; otherwise, the area and reference frame are determined in step 829, prediction-block(n) is traced in step 830 and prediction tracing continues at step 827.

During the next, "prediction-block(n) tracing" method of FIG. 8d, data for a current prediction block is further traced to its existence in picture macroblocks. As shown, in step 831, the frame number n is decremented. Next, if in step 832, all prior projected macroblocks of the current macroblock have been considered, then prediction-block(n) tracing is completed; otherwise prediction-block(n) tracing continues at step 833. In step 833, the current macroblock is projected onto reference macroblocks, and then, in step 834, counter k is set to correspond with the number of n macroblocks. If, in step 837, all n macroblocks have been considered, then prediction-block(n) tracing is completed; otherwise processing continues at step 838. In step 838, the $k^{th}$ macroblock record is loaded and then counter j is set to correspond with the total number of predictions in steps 839 and 840. Next, if, in step 841, all predictions have been considered, then prediction-block(n) tracing is completed; otherwise, the area and reference frame are determined in step 842, pixels corresponding with macroblock n are tagged in step 843, prediction-block(n) is traced in step 844, and processing continues at step 840.

During the "projected pixels tagging" method of FIG. 8e, pixels are further tagged as having an origin/result in one or more macroblocks. As shown, if, in step 851 a previous tag exists and, in step 852, the previous tag difference is less than the current tag, then projected pixel tagging is completed. Otherwise, a prediction address is formed in step 853, a target pixel is tagged with the prediction address of step 853 in step 854 and the lag is stored in step 855.

Returning to FIG. 8a, coefficient analyzer 804 utilizes coefficients received from coefficient block storage 703 of parser 621 to determine metrics that will prove useful in later decoder stages. For example, vertical activity ("Va") is measured to determine whether a current block/area is a field or frame, independent of dct_type and motion_type. As will be discussed in greater detail, such Va-metrics are preferably used by spatial analyzer 607 and decision unit 608 (FIG. 6) to facilitate control of de-interlacing. More preferably, Va is calculated in accordance with equation 3:

$$Va = \sum_{v=0}^{v=3} \sum_{u=0}^{u=7} (F[v][u] - F[v+4][u])^2 \qquad \text{[Equation 3]}$$

wherein u and v are indices of block frequency coefficient values. Coefficient analyzer 803 further measures the current DCT block energy, E, (e.g. facilitating special analyzer and decision unit classification of a block as "busy" or smooth). Total DCT block energy is more preferably as the sum of all 64 dequantized coefficients (e.g. MPEG) as given by equation 4:

$$E = \sum_{v=0}^{v=7} \sum_{u=0}^{u=7} F[v][u] \qquad \text{[Equation 4]}$$

Coefficient analyzer 803 is also preferably capable of facilitating scaling operations by determining interblock correlation (e.g. by measuring interblock DC correlation among the nine neighbors of a current block, as depicted in FIG. 8f), among other examples.

With regard to the remaining elements of bitstream processor 622, next, coefficient counter 605 and DC-extractor 805 receive the coefficient analysis results and respectively count the number of discrete cosine transform ("DCT") coefficients in each current block, and record block DC coefficient data for optical flow analysis, as will be conducted by motion analyzer 606 (FIG. 6). Finally, side information sequencer stores and sends commands to each of the analysis stages.

Continuing with FIG. 9 with reference to FIG. 6, modified block decoder 604 differs substantially from a conventional block decoder (e.g. an MPEG macroblock decoder as defined by ISO/IEC 13818-2 sections 7.2 through 7.5). For example, conventionally, only current picture header and reconstructed frame data are retained, and only for next-frame decoding within the block decoder. Contrastingly, in the present invention, coefficient data preferably provided by BPP 602 and prediction and error samples preferably provided by block decoder 604, are further utilized in subsequent processing stages. Another example is that conventional decoders apply inverse motion compensation to create a stand-alone frequency domain representation including transmitted coefficients that represent intra blocks and prediction error, and derived coefficients that represent motion compensated, forward-DCT converted samples. In contrast, the present invention preferably retains both reconstructed spatial-domain data and DCT frequency-domain data.

Among yet other examples, a conventional decoder outputs a macroblock either directly to a display or via frame buffer storage for later display. The present invention, however, preferably uses decode output (e.g. via function 905 of FIG. 9) as only an intermediate state for the benefit of subsequent picture decoding; actual presentation data is preferably performed via a later rendering stage (e.g. renderer 609 of FIG. 6). Such later display can, for example, also include (in accordance with available tools and processing resource) frames that are synthesized and/or otherwise formed from a combination of decoded frames.

FIG. 9 illustrates how block decoder 604 nevertheless operates in a largely conventional manner. Motion vectors are received by MCP 901, the output of which forms a prediction macroblock. Discrete Cosine Transform or "DCT" coefficients are further received by run-length decoder 902, then processed by inverse quantizer 903 and inverse-DCT 904, and then combined with MCP output by function 905 to form a reconstructed frame, r. However, in accordance with bitstream data utilization according to the invention, inverse quantized coefficient data and inverse-DCT results (i.e. prediction error/intra data) are preferably output to spatial analyzer 607.

Motion analyzer 606 (FIGS. 10a through 10d with reference to FIG. 6) provides for tracing the flow of picture data across several picture periods, thereby establishing a forward and backward trajectory of points, c(l,x,y), within a target picture. Motion analyzer 606 uses such trajectories to form the source for a preferably 1-D filter within renderer 609 of FIG. 6 (i.e. preferably using one pointer per tap per pixel). As a result, the otherwise incomplete bitstream vector field is refined into a more complete motion vector field (e.g. most or all pixels having an action). Motion analyzer 606 can also be used to provide additional information. For example, it is found that coding artifacts can be temporally distinguished from image features, as will be discussed in greater detail with reference to spatial analysis. Other uses will also become apparent to those skilled in the art in view of the teachings herein.

Figure 10A:
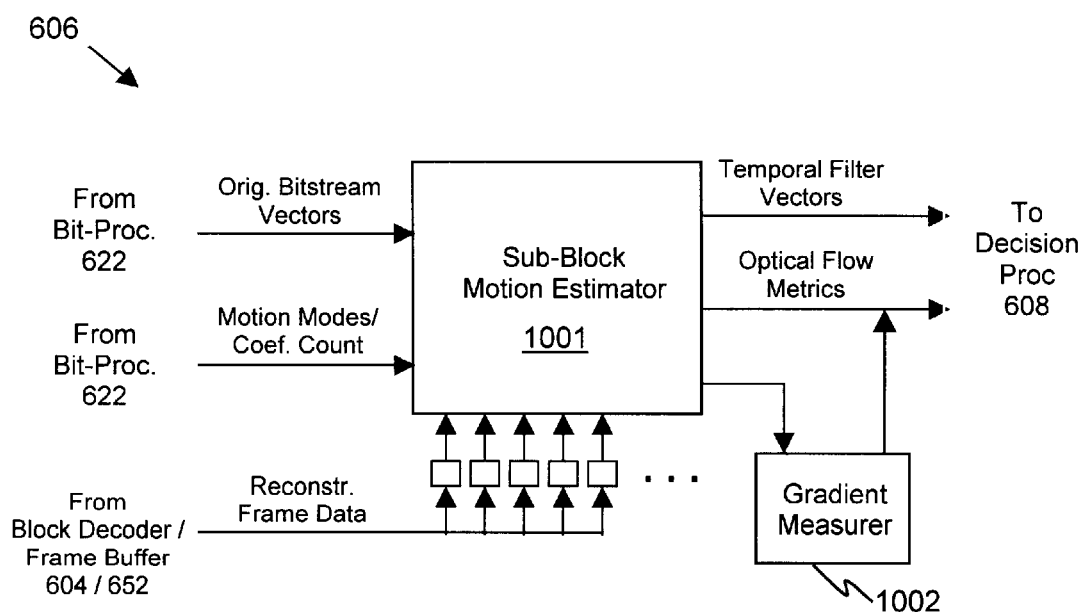
FIG. 10a is a flow diagram illustrating, in greater detail, the motion analyzer of the advanced decoder of FIG. 6.

As shown in FIG. 10a, motion estimator 1001 comprises a sub-block motion estimator 1001 and gradient measurer 1002. Operationally, motion estimator 1001 uses original bitstream vectors and motion mode and coefficient count data from bitstream processor 622, and reconstructed frame data from block decoder 604 (preferably via frame buffer 652) to produce temporal filter vectors, optical flow metrics; Gradient measurer 1002 determines gradient measurements, which measurements are transferred along with optical flow metrics to further processing elements.

The bitstream vectors serve as an initial motion model, and the decoded picture serves as an initial estimate of the original (i.e. pre-encode) picture. The initial model assumes that pixel areas displaced by a common motion vector have constant motion within the area. The hector field is gradually refined to pixel or sub-pixel level until a sufficiently "ideal" optical flow is achieved (e.g. in accordance with processing resources, throughput requirements, user control and/or other application parameters); such refinement is preferably achieved via hierarchical motion estimation. More preferably, the motion estimation pyramid levels overlap between blocks of each level to establish sub-pixel accuracy. As a rule of thumb, the enhancement or scaling factor is found to be directly proportional to the accuracy of the sub-pixel estimate. Thus, since the bitstream most often contains some half-sample vectors, there is inherent potential within every stream for a 2:1 image scaling with genuine spatial detail (harmonics) to fill the upper half of the frequency spectrum.

Figure 10B:
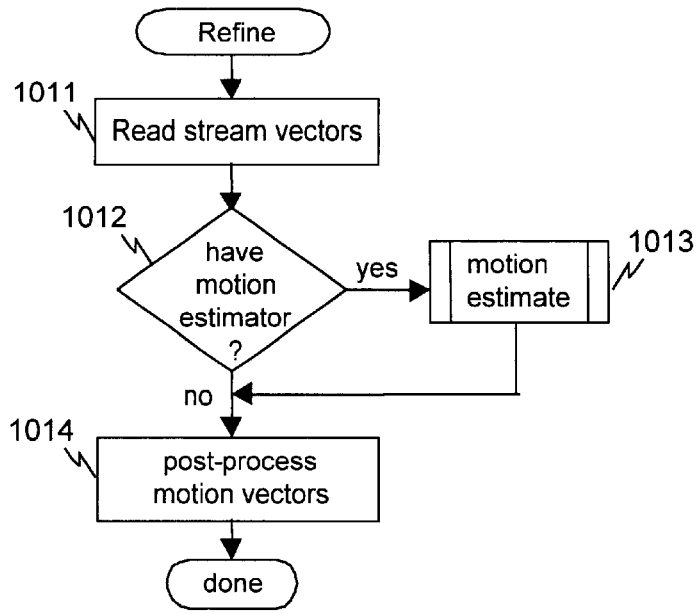
FIG. 10b is a flowchart illustrating how a complete motion estimator can be used by the motion analyzer of FIG. 6.

As illustrated in the FIG. 10b flowchart, the enhancement results achievable according to the invention would likely benefit from the use of a more extensive or "complete" motion estimator (i.e. as is conventionally used in an encoder) or, more preferably, one having a bit-accurate edge detector. It is further contemplated that, at some point, the use of such capability will be economically feasible. However, it is found that substantial motion analysis accuracy can also be achieved, and at substantially reduced cost, in accordance with an analysis of the bitstream information provided as discussed above (i.e. in nearly all cases, some motion analysis benefit has been found.)

Figure 10C:
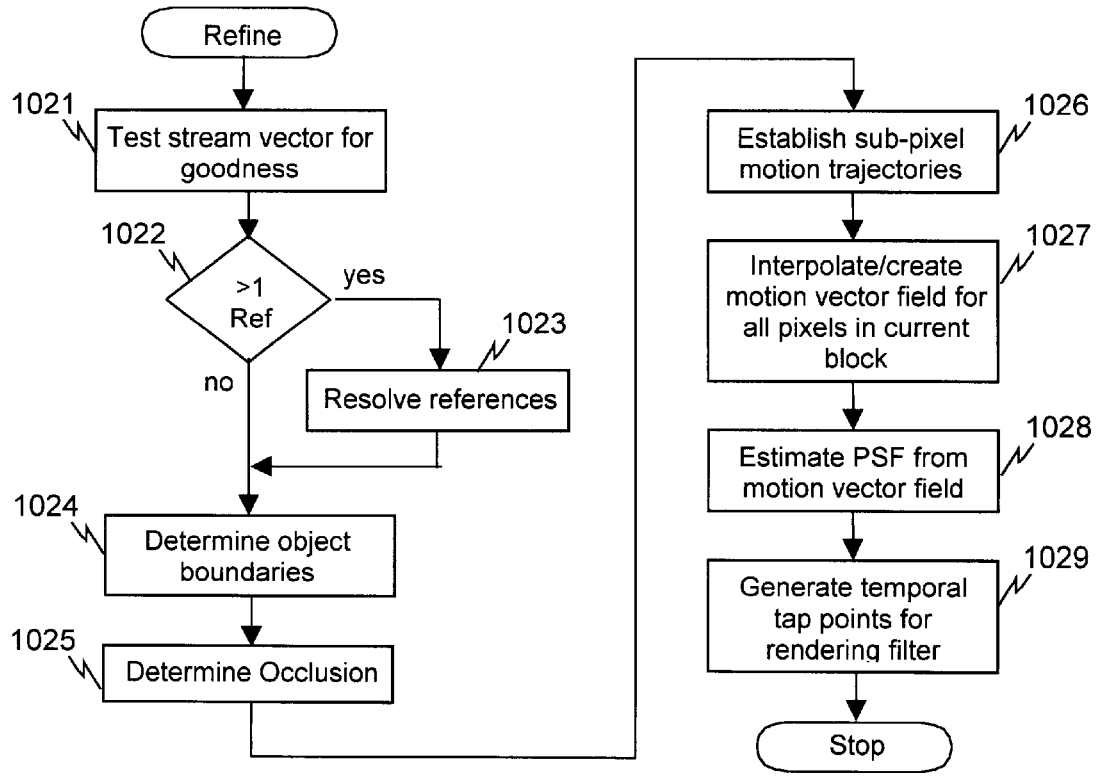
FIG. 10c is a flowchart illustrating a vector refinement method according to the invention.

The FIG. 10c flowchart illustrates motion analysis and processing tasks preferably conducted by sub-block motion analyzer 1001 in refining an incomplete vector field to produce a more complete vector field according to the invention. While the specific tasks and task ordering might be amended, and certain tasks might be conducted by other stages (i.e. as with other stages/elements), the method of 10c is calculated to provide superior refinement characteristics.

As shown, first, a stream vector is tested for "goodness" (step 1021), for example, via matching criteria (e.g. testing vector field smoothness criteria against coded bits for prediction error). If more than one reference is found for the vector (step 1022), then the references are resolved to a single reference in step 1023 (e.g. by choosing a vector value resulting in the smallest error, smallest reference difference, etc.). Next, the boundaries are determined for each object (step 1024) and incidents of occlusion are tagged (step 1025). In step 1026, more exact sub-pixel motion trajectories are established, for example, as discussed above. Next, in step 1027, a motion vector field is interpolated and/or synthesized, as needed, for all remaining pixels in the current block. Finally, the PSF is estimated from the motion vector field in step 1028, and temporal tap points are generated the rendering filter in step 1029.

Motion vector edge detection is preferably conducted by measuring vector gradients, and more preferably, using a resolution hierarchy to eliminate confusion over edge thickness.

In accordance with the use of the hierarchical pyramid motion estimator, a difference metric is also associated with each vector that decision unit 608 (FIG. 6) will examine for comparison with occlusion thresholds. DC energy is therefore preferably removed from all reference candidate and current comparison blocks to eliminate scene fade confusion.

It should also be noted that, when forming motion trajectories for objects, it is important that occlusion labels (i.e. where the current object disappears behind another object) are accurately generated. This means that some target display points will have the support of all N taps while others will not. The labels enable effective nullification of the weighted contribution of a particular frame to the target pixel.

Figure 11A:
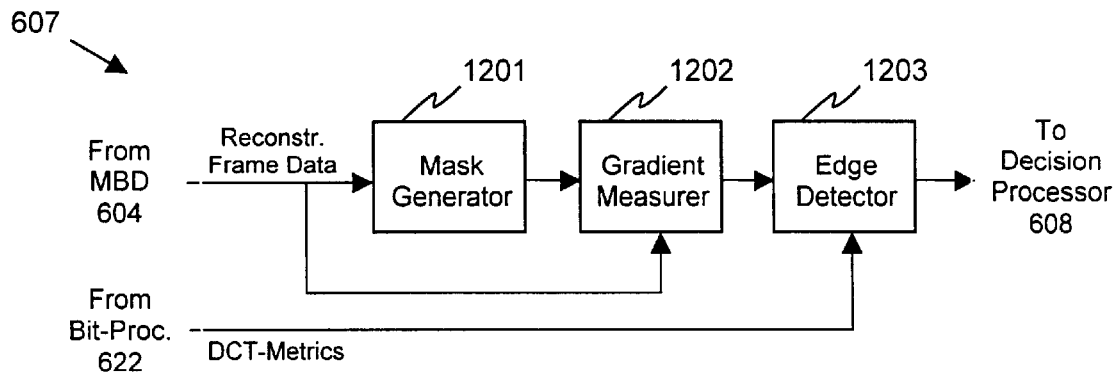
FIG. 11a is a flow diagram illustrating, in greater detail the spatial analyzer of FIG. 6.

Turning now to FIGS. 1a through 11f with reference to FIG. 6, spatial analyzer 607 performs further spatial-domain analysis and processing to provide metrics and spatial filter constants that are used by decision unit 608 in conjunction with those provided by the above stages. As shown in FIG. 11a, spatial analyzer 607 preferably comprises coupled elements including mask generator 1101, gradient measurer 1102 (preferably in addition to that of motion analyzer 606) and edge detector 1103. Broadly stated, the combination of mask generator 1101 and gradient measurer 1102 supplies metrics that enable a higher confidence level in specific edge detection results produced by edge detector 1103. More specifically, mask generator 1101 creates occlusion labels. Gradient measurer 1102 then measures gradients of surrounding pixels.

Figure 11B:
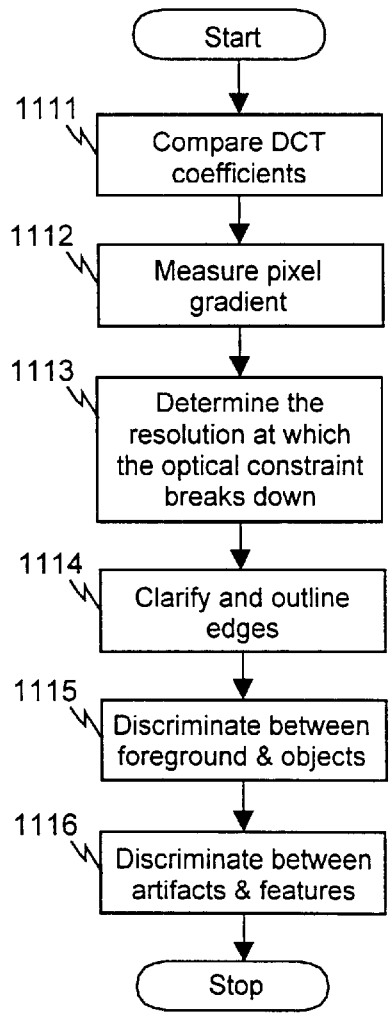
FIG. 11b is a flowchart illustrating a spatial analysis method according to the invention.

The operations (e.g. tools; operational steps; etc.) performed by spatial analyzer subsystems, as are broadly outlined in FIG. 11b and then detailed in FIGS. 11c–f, relate largely to spatial-domain edge detection according to the invention (e.g. as contrasted with the temporal-domain edge detection performed by motion-analyzer). In summary, these operations broadly comprise comparing DC coefficients, measuring pixel gradient, determining the resolution at which the optical constraint breaks down, classifying and outlining edges and discriminating between the foreground and objects (steps 1111–1115). However, such operations, as well as other operations (e.g. discriminating between artifacts and image features in step 1116) can also provide other metrics utilized by other advanced decoder stages.

Figure 11C:
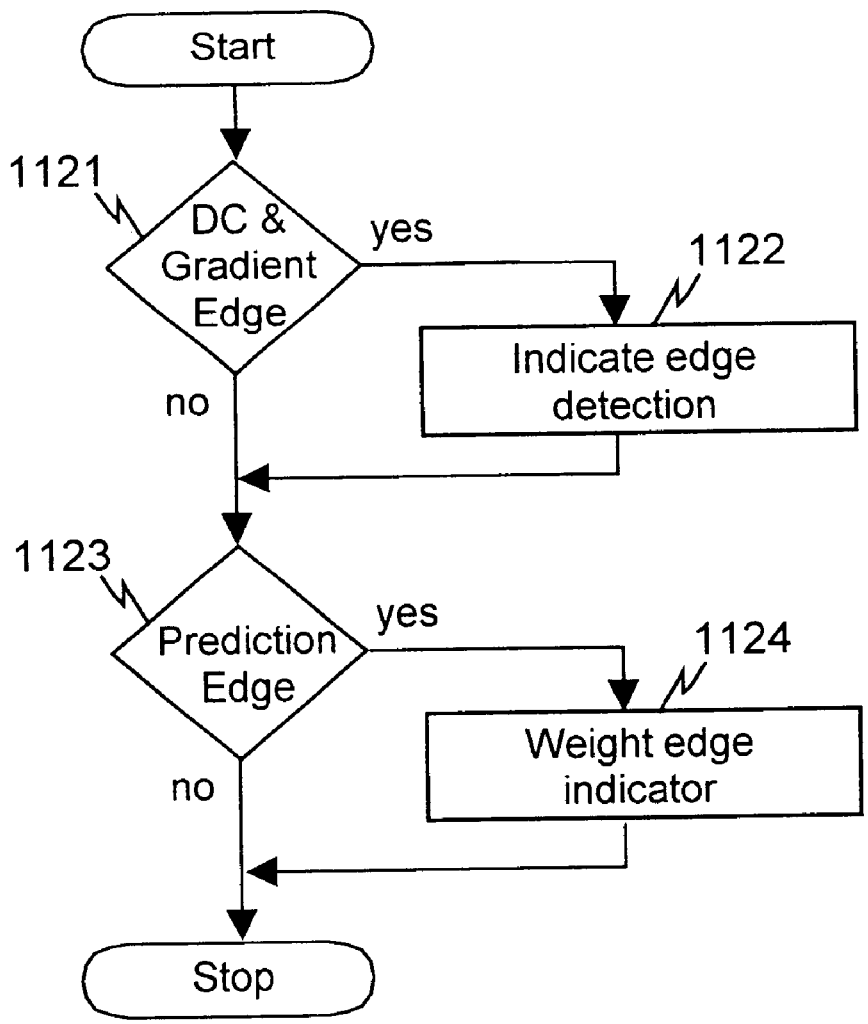
FIG. 11c is a flowchart illustrating an edge detection method according to the invention.
Figure 11E:
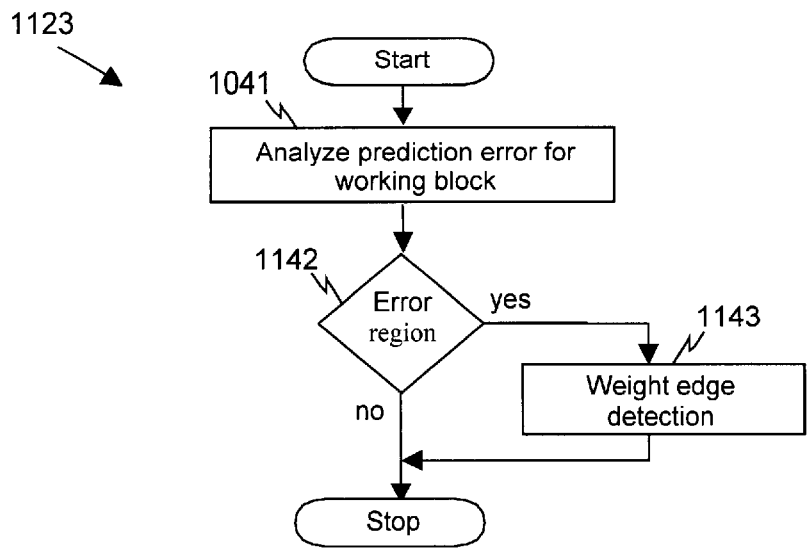
FIG. 11e is a flowchart illustrating, in greater detail, a prediction error based edge detection method useable in conjunction with the edge detection method of FIG. 11c according to the invention.

For example, FIG. 11c, with reference to FIGS. 11d and 11e, illustrates an advanced edge detection method according to the invention that utilizes steps 1111 through 1115 of FIG. 11b to provide a high degree of confidence as to the actual existence of each detected edge. As shown, two further methods (or "sub-methods") are utilized. In DC arid gradient edge detection, the detection of DC and gradient criteria is found to be generally very reliable and is used to trigger an edge detection indicator (steps 1121 and 1122). Thereafter, supplemental edge detection, such as prediction edge detection (steps 1123 and 1124), while not essential, is preferably further utilized to weight the confidence level as to a DC and gradient indicated edge.

DC and gradient edge detection according to the invention (FIG. 11d) more specifically comprises inter-block and intra-block elements respectively. The inter-block element (steps 1131–1132) comprises analyzing DCT-DC coefficients (e.g. provided by prior stages) of the current working block and surrounding blocks for optical flow characteristics (step 1131). These blocks should have similar DC coefficients (step 1132) to meet optical flow constraints. The intra-block element (steps 1133–1134) measures gradients for each pixel in a current or "working" block (step 1133).

The gradient should be small to meet optical flow constraints (step 1134). Hierarchical determination via a resolution pyramid is further preferably used to determine the resolution level at which the optical constraint breaks down. Finally, in step 1135, a block meeting both criteria is classified as meeting the spatial optical flow constraint.

Prediction edge detection according to the invention (FIG. 11e) more specifically comprises analyzing prediction error for a working block (step 1141). A sudden increase in prediction error (step 1142), while not necessarily determinative as to the existence of an edge (i.e. as detail might produce such an effect), is a sufficiently strong indicator that a prior edge indication should be more heavily weighted (step 1143).

Returning to FIG. 11b, edge detection, as well as classification and outlining (step 1114) are used, for example, to avoid mixing or bleeding energy from adjacent objects or background within the picture during filtering. Once edge detection has occurred, a first estimate of object/background separation can be given in accordance therewith. This information can further be correlated with edge detection and outlining established by other tools to attain an even stronger or "more heavily weighted" confidence factor (e.g. with a sufficiently weighted and/or threshold confidence being accepted as an edge or edge measure/degree).

Figure 11F:
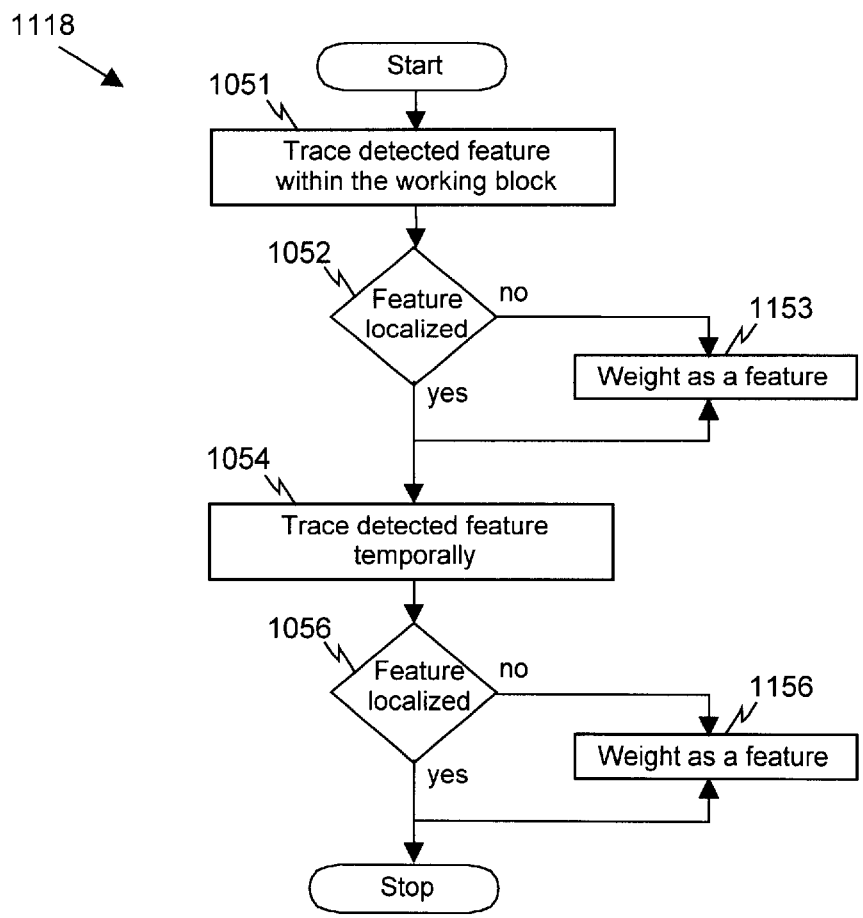
FIG. 11f if is a flowchart illustrating a method for distinguishing element features from artifacts according to the invention.

Finally, discriminating between artifacts and image features (step 1116 of FIG. 11b) is discussed in greater detail with reference to FIG. 11f. Although a good encoder should never create visible artifacts, it is important that invisible artifacts are not amplified beyond the perceptual threshold. Therefore, to discriminate between artifacts and features, spatial analyzer 607 traces potential features within the working image to see if they extend from one block to another (step 1161). Coding artifacts are found to be typically constrained within the limits of the DCT filter (i.e. 8×8 points), whereas image features are typically consistent across block borders. Thus, only potential features not constrained within a block are preferably weighted as features (steps 1162 and 1163). As noted earlier, motion analyzer 606 further creates trajectories which can further correlate this understanding across multiple frames (steps 1164 through 1166).

Figure 12A:
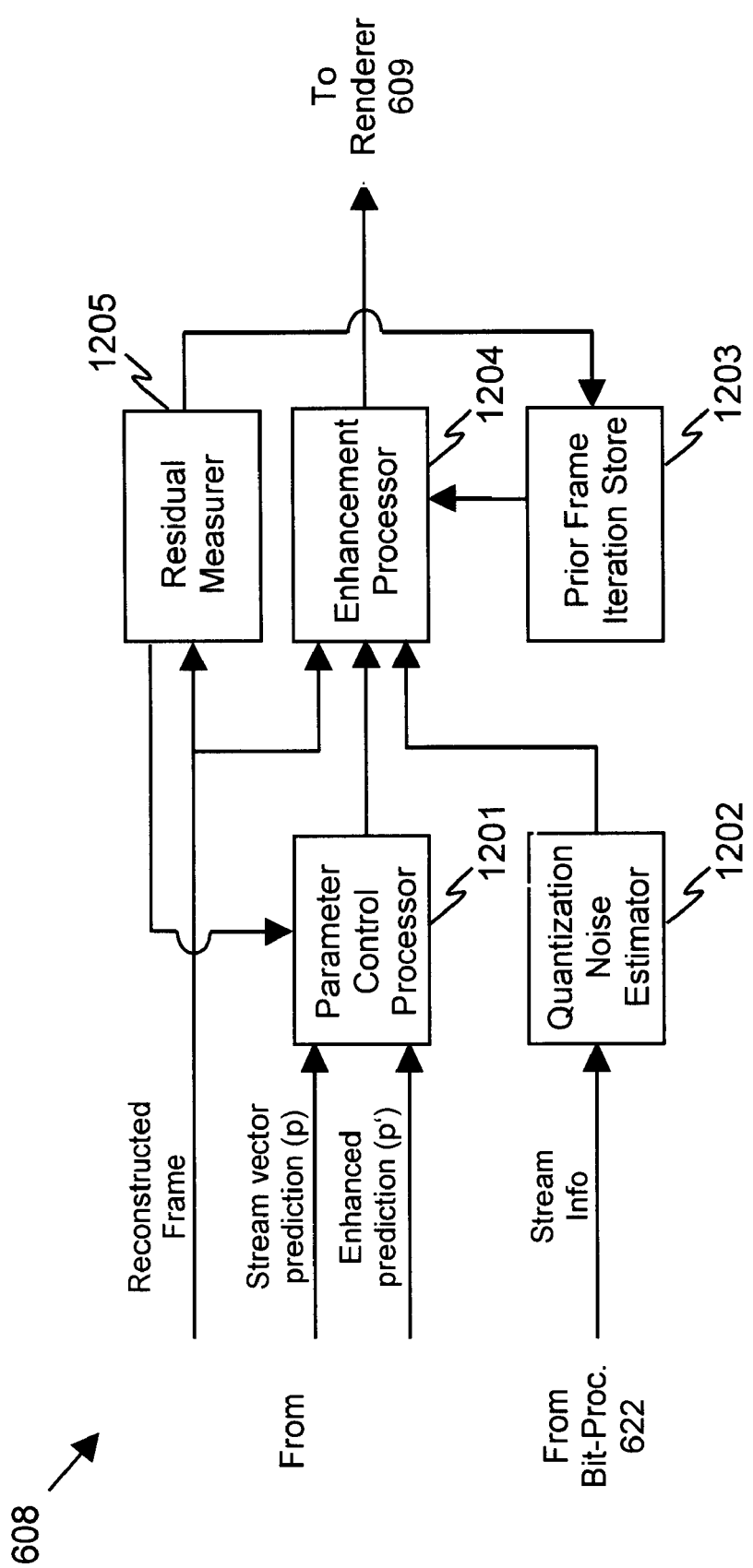
FIG. 12a is a flow diagram illustrating, in greater detail the decision processor of FIG. 6.
Figure 12B:
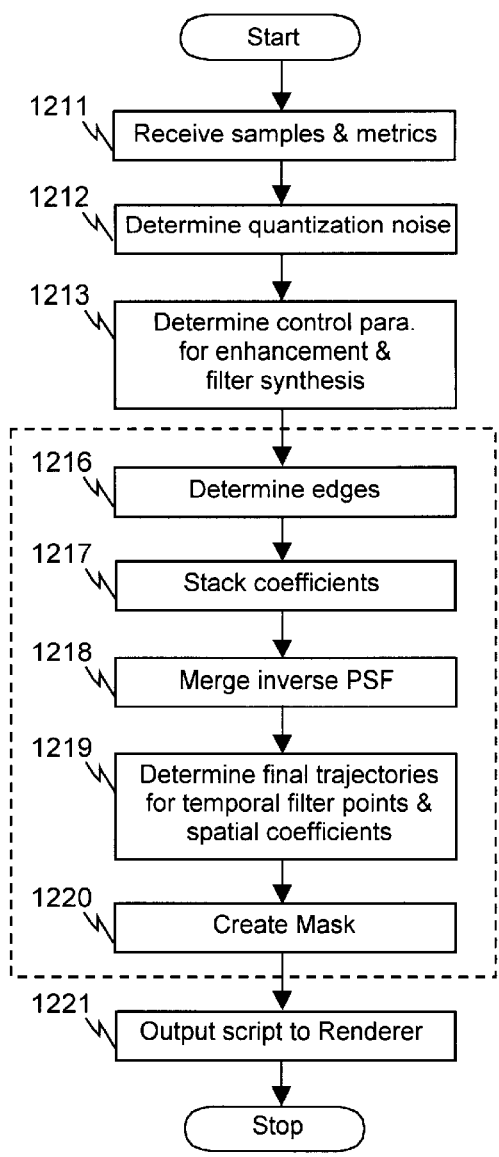
FIG. 12b is a flowchart illustrating a decision processing method according to the invention.
Figure 12C:
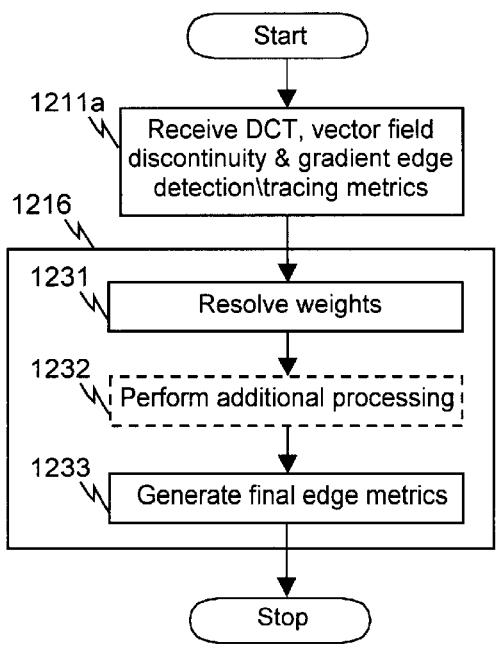
FIG. 12c is a flowchart illustrating a cumulative edge detection method according to the invention.

Turning now to FIGS. 12a through 12c with reference to FIG. 6, decision processor 608 can also be more easily viewed as the third stage of an advanced decoder model having four fundamental stages: setup, measurement, decision and execution. Using this model, the setup stage includes bitstream parser-processor 602 and modified block decoder 604, the measurement stage includes motion analyzer 606 and spatial analyzer 607, the decision stage includes decision processor 608, and the execution stage includes renderer 609 (FIG. 6). Decision processor 608 preferably comprises much of the advanced decoder heuristics in the form of a parallel processing engine resembling a 3-D graphics engine rather than a conventional decoder element. That is, it receives reconstructed image data and metrics from the prior stages, resolves associative/cumulative metrics, conducts final pre-display processing (e.g. enhancement) and outputs data and instructions, more preferably a script, according to which images are rendered.

Decision processor 608, as is broadly illustrated in FIG. 12a, preferably comprises coupled elements including parameter control processor ("PCP") 1201, quantization noise estimator 1202, prior frame iteration store 1203, enhancement processor 1204 and residual processor 1205. Such elements, as with other elements of advanced decoder, preferably operate in accordance with application parameters (not shown), thereby adding greater flexibility. PCP 1201, processes received metrics, including stream vector prediction and enhanced prediction, to provide control parameters for enhancement processing as performed by enhancement processor 1204. Quantization noise estimator 1202 receives stream information from bit processor 622 and estimates an effective noise distribution. Prior frame iteration store 1203 retains residual parameters for using during subsequent enhancement processing iterations. Finally, enhancement processor 1204 receives metrics and parameters from all other decision processor elements, performs actual image enhancement and produces the script utilized by renderer 609. Those skilled in the art will appreciate that iteration can also be utilized to further refine enhancement (e.g. in accordance with resulting residuals, to further refine estimations, etc.)

Decision processor operation preferably comprises the steps outlined in FIG. 12b. As discussed, decision processor 608 receives samples and metrics (step 1211), determines quantization noise (step 1212), determines control parameters for enhancement and filter synthesis (step 1213) and performs enhancement operations (steps 1216 through 1220) to produce output used for display (step 1221). More specifically, decision processor provides final edge detection processing (step 1216). As is more specifically illustrated in FIG. 12c, decision processor 608 "pulls together" above-discussed multiple domain clues to edges within a picture including: DCT data from bitstream processor 622, vector field discontinuity data from motion analyzer 606 and gradient detection from spatial analyzer 607 (step 1211a). Decision processor 608 further resolves the above-discussed edge-likelihood weight indications (step 1231), optionally performs additional edge processing (step 1232), and then generates final edge metrics (step 1233).

Returning again to FIG. 12b, decision processor 1208 further performs other enhancement processing, including stacking of DCT coefficients (step 1217). Stacking refers to the process of determining image regions having pure motion translation. Areas that do not move within the picture with minimal DCT energy are preferably integrated across several frame periods to reduce posterization. Additionally, decision processor 608 merges the inverse PSF with optical flow measurements in step 1218 (e.g. prior edges, coefficients, metrics, etc.). Decision processor 608 further determines, from the accumulated information, the final trajectories for temporal filter points and spatial coefficients (step 1220) and forms a mask (step 1219) to nullify filtering along edges and thereby avoid the above-discussed smearing effects (step 1220).

Renderer 609 (FIG. 13) provides for creating display blocks from the data (e.g. a script) supplied by decision processor 608. As with decision processor 608, renderer 609 preferably represents a significant departure from standard decoding by operating instead according to 3-D graphics practices. More specifically, renderer 609 resembles a 3-D rendering engine. Among other advantages, the combination of 3-D processing-based decision processing and rendering enables advanced 3-D display operations to be utilized for video, as well as for video in combination with still images, graphics and/or other multimedia. For example, the present invention can utilize 3-D methods to warp new image areas from a combination of coded frames in order to create interpolated display flames. It is therefore not only possible to improve the accuracy of resultant images, but also to reduce the bandwidth required to transmit compressed video, since, for example, more information can be extrapolated (e.g. using diffused data, meta data and/or cooperative processing as provided in the above-mentioned co-pending applications). Another example is the ability to use a script of blocks, triangles and/or other elements and execute commands to produce display elements, among numerous other examples, as will be apparent to those skilled in the art in view of the teachings herein.

Figure 13:
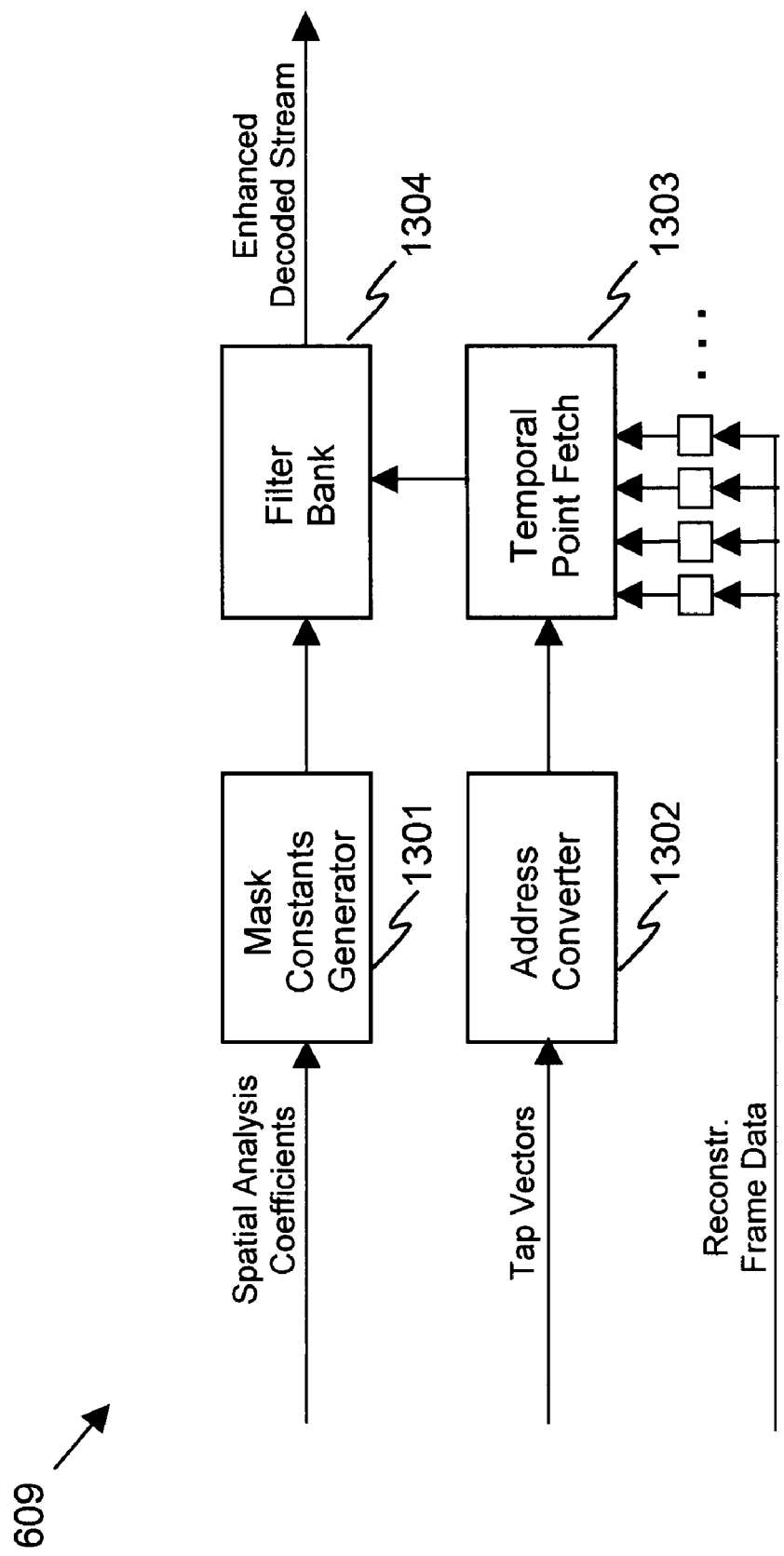
FIG. 13 is a flow diagram illustrating, in greater detail, the renderer of FIG. 6.

As depicted in FIG. 13, the indicated spatial analysis coefficients are passed to a mask constants generator 1301 from decision unit 608. Such spatial analysis coefficients are used to supply a filter bank 1304 with data, such as temporal filter sample points that can be employed in the rendering process (see, step 1219 of FIG. 12B). As its name implies, mask constants generator 1301 converts the received spatial analysis coefficients produced by decision unit 608 into parameters that are useable by filter bank 1304.

Tap vectors are also passed to address converter 1302 from decision unit 608 but are generally derived, at least in part, by motion analyzer 606 and can be refined by spatial analyzer 607 as well as decision unit 608. Tap vectors identify for the renderer, locations within reconstructed frames 652 (FIG. 6) that temporal filter sample points can be located. The address converter 1302, then generates memory address locations within reconstructed frames 652 such that a temporal point fetch component 1303, can retrieve samples for evaluation and to allow output of an enhanced decoder stream. It will be understood that as shown in FIG. 13, each of sub-elements 1301, 1302, 1303 and 1304 are coupled to each other as indicated.

While the present invention has been described herein with reference to particular embodiments thereof, a degree of latitude of modification, various changes and substitutions are intended in the foregoing disclosure, and it will be appreciated that in some instances some features of the invention will be employed without corresponding use of other features without departing from the spirit and scope of the invention as set forth.

What is claimed is:

1. A method for enhanced video reconstruction, comprising:

receiving encoded digital video bitstream data into a bitstream buffer, the bitstream buffer comprising a plurality of buffer portions;

receiving buffered encoded digital video bitstream data into a Bitstream Parser-Processor (BPP);

determining from the buffered encoded digital video bitstream data an initial state of a plurality of bitstream data components within the buffered encoded digital video bitstream data;

deriving a second state of the plurality of bitstream data components, the deriving comprising the BPP interacting with at least one of the plurality of buffer portions, a high-layer state storage element and at least one of a plurality of enhanced bitstream data analysis and decision elements;

receiving the second state of the plurality of bitstream data components and the buffered encoded bitstream data into a block decoder element of the plurality of enhanced bitstream data analysis and decision elements;

decoding the buffered encoded bitstream data employing the received plurality of bitstream data components;

transferring the decoded bitstream data to a frame buffer as a first video frame;

deriving a third state of the plurality of bitstream data components using the plurality of enhanced bitstream data analysis and decision elements; and employing the third state of the plurality of bitstream data components for reconstructing the first video frame into a second video frame.

2. The method of claim 1, where the plurality of buffer portions comprises an input buffer portion, a current buffer portion and a previous buffer portion.

3. The method of claim 2, where the receiving buffered encoded digital video bitstream data into the BPP comprises receiving the buffered encoded digital video bitstream data from the input buffer portion.

4. The method of claim 2, where the BPP interacting with at least one of the plurality of buffer portions comprises the BPP interacting with the current buffer portion and/or the previous buffer portion.

5. The method of claim 1, where the plurality of enhanced bitstream data analysis and decision elements comprises one or more elements selected from the group consisting of a modified block decoder element, a motion analysis element, a spatial analysis element and a decision unit element.

6. The method of claim 1, where the BPP comprises a parser portion and a bitstream processor portion, the parser portion further comprising a motion vector reconstructor sub-portion and a coefficient block storage sub-portion and the bitstream processor portion further comprising one or more sub-portions selected from the group of sub-portions consisting of a motion vector post-processor sub-portion, a motion tracer sub-portion, a coefficient analyzer sub-portion, a coefficient counter sub-portion, a DC extractor sub-portion and a side into sequencer sub-portion.

7. The method of claim 1, where the BPP comprises a motion vector reconstructor sub-portion and a motion vector post processor sub-portion, the motion vector post processor sub-portion receiving motion vectors from the motion vector reconstructor sub-portion and determining an effect of each of the motion vectors upon sample areas in a plurality of second video frames.

8. The method of claim 1, where the decoding comprises retaining at least one of reconstructed spatial-domain data and DCT frequency-domain data for use in decoding, and outputting at feast one of prediction macroblock data, inverse-DCT result data and inverse quantized coefficient data, in addition to outputting the first video frame.

9. The method of claim 1, where the plurality of enhanced bitstream data analysis and decision elements comprises a motion analysis element, the motion analysis element further comprising a sub-block motion estimator sub-element and a gradient measurer sub-element, the motion analysis element analyzing bitstream data from the BPP and first frame data from the block decoder and/or frame buffer to derive third state data.

10. The method of claim 9, where deriving third state data comprises:

using original bitstream vectors and motion mode and coefficient count data outputted from the BPP with first video frame data from the block decoder to produce temporal filter vectors and optical flow metrics; and determining gradient measurements from temporal filter vectors and optical flow metrics.

11. The method of claim 9, where deriving third state data comprises determining motion vectors from original bitstream vectors, the motion vectors having a granularity that is finer than that of the original bitstream vectors.

12. The method of claim 9, where deriving third state data comprises performing motion analysis using hierarchical motion estimation.

13. The method of claim 1, where the plurality of enhanced bitstream data analysis and decision elements comprises a spatial analysis element, the spatial analysis element further comprising a mask generator sub-element, a gradient measurer sub-element and an edge detector sub-element, the spatial analysis element analyzing bitstream data from the BPP and first frame data from the block decoder and/or frame buffer to derive third state data.

14. The method of claim 13, where deriving third state data comprises:

using the mask generator sub-element to create occlusion labels;

using the gradient measurer sub-element to measure gradients of surrounding pixels;

using the occlusion labels and measured gradients for edge detection; and deriving spatial-domain analysis data.

15. The method of claim 13, where deriving third state data comprises:

performing gradient measurements of motion vector and or spatial vector data; and performing hierarchical motion estimation temporal processing.

16. The method of claim 1, where the plurality of enhanced bitstream data analysis and decision elements comprises a decision unit element, the decision unit element further comprising a parameter control processor sub-element, a quantization Noise estimator sub-element, a residual measurer sub-element an enhancement processor sub-element and a prior frame iteration storage sub-element, the decision unit element analyzing data received from the BPP, the block decoder and/or frame buffer, the spatial analysis element and the motion analysis element to derive data for rendering.

17. The method of claim 16, where deriving data for rendering comprises:

receiving DCT data from the BPP;

receiving vector field discontinuity data the motion analyzer element;

receiving gradient detection from the spatial analyzer element; and performing stream vector prediction, enhanced prediction and generating final edge metrics.

18. The method of claim 16, where deriving data for rendering comprises merging an inverse point spread function with optical flow measurements.

19. The method of claim 1, where deriving a third state of the plurality of bitstream data components further comprises utilizing 3-D methods for warping new image areas to create interpolated video frame data.

20. The method of claim 1, where deriving a third state of the plurality of bitstream data components further comprises:

processing intertrame dependence between adjacent groups of pictures (GOP) data blocks, where such processing includes interframe filtering; and applying meta data multiplexed within a plurality of adjacent GOP's for processing each of the GOP's.

* * * * *